United States Patent
Muellner et al.

(10) Patent No.: US 12,529,162 B2
(45) Date of Patent: Jan. 20, 2026

(54) METHOD OF SCREENING FOR PEPTIDES CAPABLE OF BINDING TO A UBIQUITIN PROTEIN LIGASE (E3)

(71) Applicant: Phoremost Limited, Pampisford (GB)

(72) Inventors: Markus Muellner, Pampisford (GB); Alberto Moreno, Pampisford (GB); Marta Carrara, Pampisford (GB); Jennifer Howes, Pampisford (GB)

(73) Assignee: Phoremost Limited, Pampisford (GB)

( * ) Notice: Subject to any disclaimer, the term of this patent is extended or adjusted under 35 U.S.C. 154(b) by 1106 days.

(21) Appl. No.: 17/610,593

(22) PCT Filed: May 13, 2020

(86) PCT No.: PCT/GB2020/051163
§ 371 (c)(1),
(2) Date: Nov. 11, 2021

(87) PCT Pub. No.: WO2020/229818
PCT Pub. Date: Nov. 19, 2020

(65) Prior Publication Data
US 2022/0236273 A1   Jul. 28, 2022

(30) Foreign Application Priority Data

May 13, 2019  (GB) ..................... 1906705

(51) Int. Cl.
  *C40B 30/06*   (2006.01)
  *C12N 15/10*   (2006.01)
(52) U.S. Cl.
  CPC .......... *C40B 30/06* (2013.01); *C12N 15/1034* (2013.01)

(58) Field of Classification Search
None
See application file for complete search history.

(56) References Cited

FOREIGN PATENT DOCUMENTS

| WO | WO 2016/118666 A1 | 7/2016 |
| WO | WO 2017/011371 A1 | 1/2017 |
| WO | WO 2018/226542 A1 | 12/2018 |
| WO | WO 2019/043217 A1 | 3/2019 |

OTHER PUBLICATIONS

An, S et al., "Small-molecule PROTACs: An emerging and promising approach for the development of targeted therapy drugs," *EBioMedicine*, vol. 36, pp. 553-562 (2018).
(Continued)

*Primary Examiner* — Christian C Boesen
(74) *Attorney, Agent, or Firm* — Bookoff McAndrews, PLLC

(57) ABSTRACT

The present invention relates to a method of screening for peptides capable of binding to a ubiquitin protein ligase (E3), successful binding being determined by detecting the amount of a test protein in the cell. The invention relates to a method for determining if a peptide binds or is capable of binding to a ubiquitin protein ligase (E3) and thereby leads to degradation of a test protein, wherein the peptide is between about 7 and 110 amino acids in length, the method comprising: providing in a eukaryotic cell a candidate peptide functionally linked to a test protein, under conditions enabling ubiquitination of proteins by an E3; and detecting the amount of test protein present in the cell; whereby, a reduced amount of the test protein determines the candidate peptide as a peptide that binds or is capable of binding to an E3 (an E3-binding peptide).

16 Claims, 13 Drawing Sheets

Figure 1:
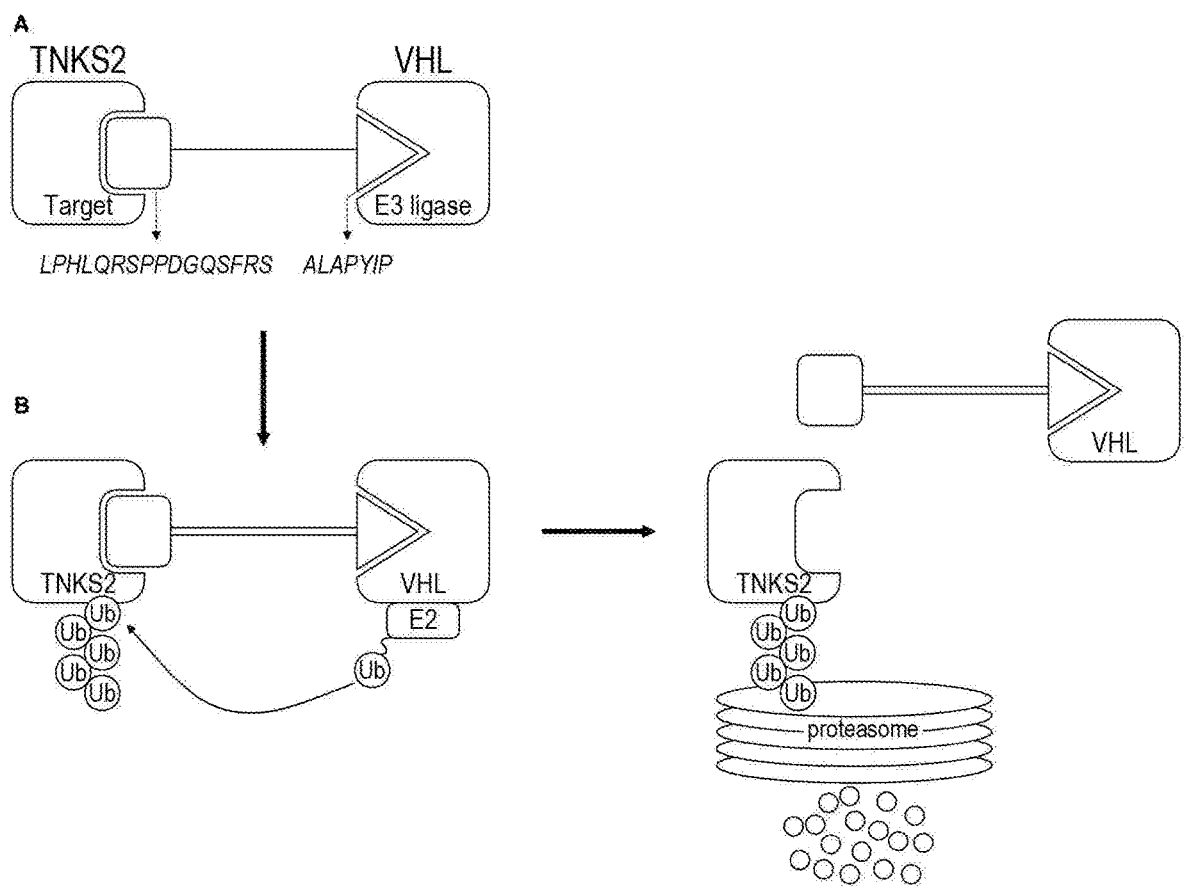

Specification includes a Sequence Listing.

(56) References Cited

OTHER PUBLICATIONS

Arai, R et al., "Design of the linkers which effectively separate domains of a bifunctional fusion protein," *Protein Engineering*, vol. 14, No. 8, pp. 529-532 (2001).

Chen, X et al., "Fusion Protein Linkers: Property, Design, and Functionality," *Advanced Drug Delivery Reviews*, vol. 65, No. 10, pp. 1357-1369 (2013).

Girardini, M et al., "Cereblon versus VHL: Hijacking E3 ligases against each other using PROTACs," *Bioorganic & Medicinal Chemistry*, vol. 27, pp. 2466-2479 (2019).

Liu, Y et al., "Small molecule therapeutics targeting F-Box proteins in cancer," *Semin Cancer Biol.*, vol. 36, pp. 105-119 (2016).

Scheepstra, M et al., "Bivalent Ligands for Protein Degradation in Drug Discovery," *Computational and Structural Biotechnology Journal*, vol. 17, pp. 160-176 (2019).

Chu, T. et al., "Specific Knockdown of Endogenous Tau Protein by Peptide-Directed Ubiquitin-Proteasome Degradation," *Cell Chemical Biology*, vol. 23, No. 4, pp. 453-461 (2016).

Gu, J. et al., "Identification of a Sequence Element from p53 That Signals for Mdm2-Targeted Degradation," *Molecular and Cellular Biology*, vol. 20, No. 4, pp. 1243-1253 (2000).

Hines, J. et al., "Posttranslational protein knockdown coupled to receptor tyrosine kinase activation with phosphoPROTACs," *Proceedings of the National Academy of Sciences*, vol. 110, No. 22, pp. 8942-8947 (2013).

International Search Report and Written Opinion for PCT/GB2020/051163, dated Sep. 7, 2020 (5 pages).

Koren, Itay et al., "The Eukaryotic Proteome Is Shaped by E3 Ubiquitin Ligases Targeting C-Terminal Degrons," *Cell*, vol. 173, No. 7, pp. 1622-1635 (2018).

Ozaki, T. et al., "p73-Binding Partners and Their Functional Significance," International Journal of Proteomics, vol. 2010, pp. 1-12 (2010).

Padmadas, N. et al., "Binding Patterns Associated AB-HSP60 p458 Conjugate to HLA-DR-DRB Allele of Human in Alzheimer's Disease: An In Silica Approach," *Interdisciplinary Science Computational Life Sciences*, vol. 10, pp. 93-104 (2018); published online Apr. 23, 2016.

Saxinger, C. et al., "Fully automated synthesis of (phospho)peptide arrays in microtiter plate wells provides efficient access to protein tyrosine kinase characterization," *BMC Immunology*, vol. 6, No. 1, pp. 1-15 (2005).

Fig. 12

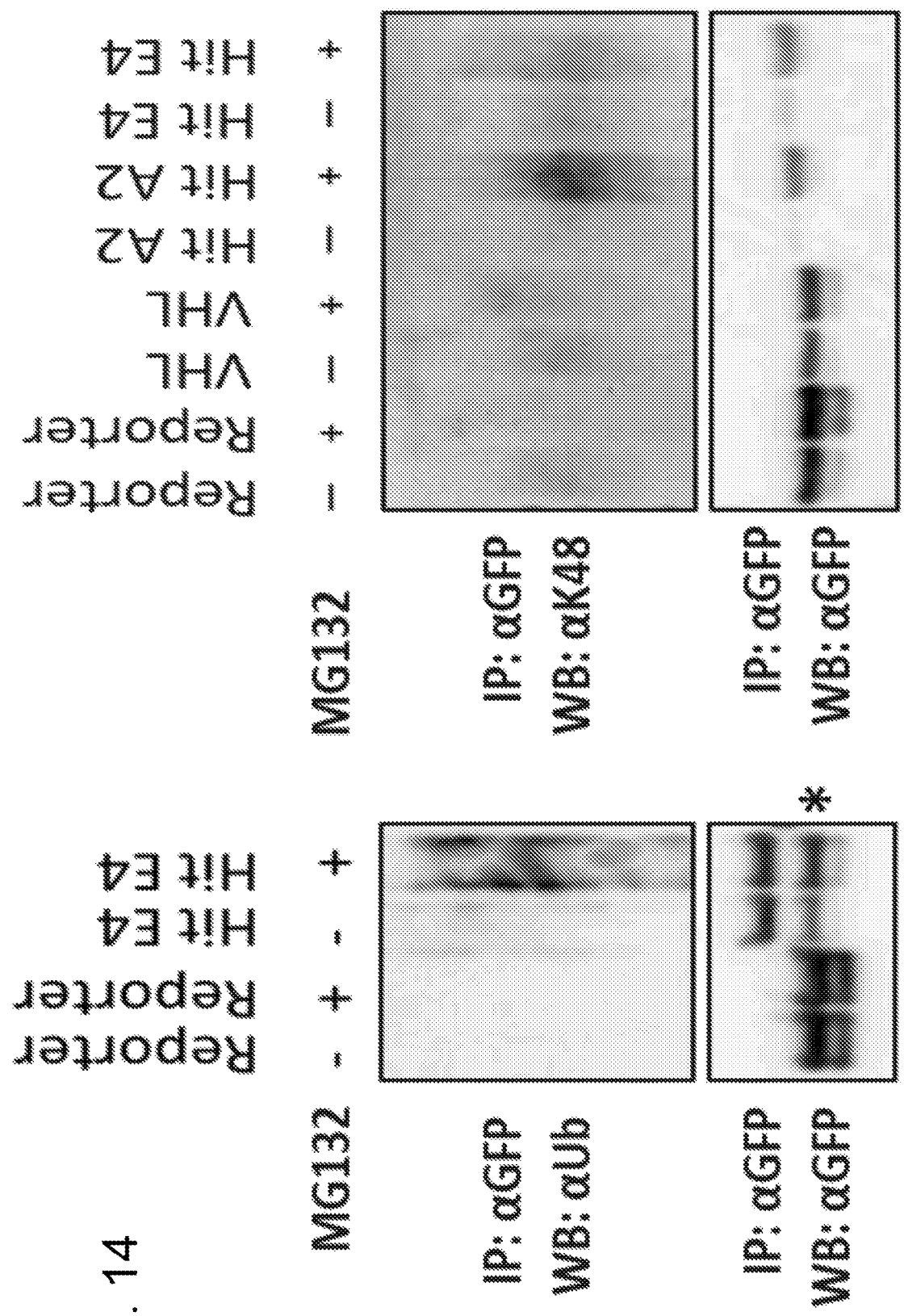

METHOD OF SCREENING FOR PEPTIDES CAPABLE OF BINDING TO A UBIQUITIN PROTEIN LIGASE (E3)

CROSS-REFERENCE TO RELATED APPLICATIONS

This application is a U.S. national stage filing under 35 U.S.C. § 371 of International Application No. PCT/GB2020/051163, filed on May 13, 2020, which claims the benefit of priority to GB Application No. 1906705.7, filed on May 13, 2019.

SEQUENCE LISTING

This application contains a sequence listing, submitted electronically in ASCII format under the filename Sequence-_Listing.txt, which is incorporated by reference herein in its entirety. The ASCII copy of the sequence listing was created on Nov. 10, 2021, and is 6,088 bytes in size.

TECHNICAL FIELD

This invention relates to a method of screening for peptides capable of binding to a ubiquitin protein ligase (E3), successful binding being determined by detecting the amount of a test protein in the cell.

BACKGROUND

Proteolysis of proteins is crucial in regulation of cellular processes. Abnormal proteolysis is associated with diseases such as Alzheimer's wherein there is an accumulation of unwanted peptides and/or proteins leading to the formation of aggregates. One of the mechanisms of achieving proteolysis is via the ubiquitin proteolytic system. Proteins and/or peptides are targeted for degradation by adding ubiquitin to the target proteins and/or peptide which removes unwanted proteins.

Chimeric constructs have been developed as a novel way of specifically targeting proteins and/or peptides for proteolysis. PROTACs (proteolysis targeting chimera) are chimeric constructs having a target protein binding moiety and an E3 (ubiquitin) ligase binding moiety, bringing the target protein in close proximity to the E3 ligase for ubiquitination (WO0220740 A2). As E3 ubiquitin ligases play a crucial role in the induction of degradation and therefore regulation of cellular processes, they are an attractive therapeutic target.

There are approximately 500-1000 human E3 ligases as estimated by human genome sequence analysis. These can be divided into four families: ECT-domain E3s (HECT E3s; homologous to E6AP C terminus E3s), U-box E3s, monomeric RING E3s (RING-finger E3s) and multi-subunit E3s (WO2018064589). Currently only a very limited number of known E3 ligases have been demonstrated to be linkable in a targeted degradation approach (e.g. Mouse double minute 2 homolog (MDM2), Von Hippel-Lindau (VHL), Cereblon (CRBN), F-box/WD repeat-containing protein 1A (FBXW1A; beta-TrCP1) and Cellular Inhibitor of Apoptosis Protein 1 (c-IAP1; BIRC2)) (see WO2016118666, WO2019043217, WO2018226542 and WO2017011371; An S, Fu L. EBioMedicine (2018), Volume 36, 553-562; Liu Y, Mallampalli R K. Semin Cancer Biol. (2015) 36:105-119). MDM2, VHL, CRBN, FBXW1A and c-IAP1 ligases all belong to the RING E3 ligase family, the largest family of E3s (Bulatov E and Ciulli A. Targeting Cullin-RING E3 ubiquitin ligases for drug discovery: structure, assembly and small-molecule modulation. Biochem J. 2015). Despite the crucial role played by E3 ligases in cellular regulation, to date the majority of PROTACs are designed to recruit either VHL or CRBN to induce ubiquitination (Girardini et al., Cereblon versus VHL: Hijacking E3 ligases against each other using PROTACS. Bioorganic & Medicinal Chemistry, 2019). Whilst the basic PROTAC technology has been a promising advance in drug discovery, this use of a restricted subset of E3 ligases, belonging to only one family, limits the utility of the technology. The majority of known E3 ligases are yet to be exploited, meaning that none from the HECT, U-box or multi-subunit E3 family have been recruited via PROTACs. Further, it is expected that currently unknown or uncharacterised E3 ligases will show variation in degradation efficiency and selectivity for target proteins over those previously studied, potentially leading to improvements in degradation and therapeutic efficacies (Scheepstra et al., Bivalent Ligands for Protein Degradation in Drug Discovery. Computational and Structural Biotechnology Journal. 2019).

There is a need therefore to develop methods to identify new E3 binding moieties, and/or the E3 ligases with which they interact, in order to exploit the full potential of E3 ligases in a PROTAC-based targeted degradation approach. Such methods may further permit the identification and exploitation of currently unknown or uncharacterised E3 ligases. In addition, the identification of new E3 binding moieties may enable differential expression among E3 ligases to be exploited, in order to target therapeutic PROTACs to a specific tissue type, cell type or developmental stage.

It is against this background that the present inventors have developed a new functional screening method for candidate E3-binding moieties.

SUMMARY

In a first aspect, the invention provides a method for identifying a peptide that binds or is capable of binding to a ubiquitin protein ligase (E3), wherein the peptide is between about 7 and 110 amino acids in length,
the method comprising:
provoding in a eukaryotic cell a candidate peptide functionally linked to a test protein, under conditions enabling ubiquitination of proteins by an E3;
detecting the amount of test protein present in the cell, whereby, a reduced amount of the test protein determines the candidate peptide as a peptide that binds or is capable of binding to an E3 (an E3-binding peptide); and
identifying the E3-binding peptide.

The amino acid sequence of the E3-binding peptide may not consist of an amino acid sequence of a known E3-binding peptide; thereby a new E3-binding peptide may be identified by the methods of the invention.

Functional linkage/functionally linked as used herein refers to peptides, polypeptides or proteins that interact with each other, either due to being physically linked (e.g. via a linker peptide, or due to being separate domains of a fusion protein), or due to their coming into proximity (e.g. in vitro or intracellularly) and thereby interacting and/or forming a complex. Where peptide, polypeptides or proteins form parts of a (recombinant) fusion protein, this may be generated by genetic fusion. This genetic fusion may be at any appropriate point in the sequence, not simply limited to the termini. Those skilled in the art will appreciate that the fusion protein may be expressed recombinantly in an appropriate cell.

"Recombinant" as used herein to describe a protein or peptide means one expressed from a polynucleotide of genomic, cDNA, semisynthetic, or synthetic origin which, by virtue of its origin or manipulation: (1) is not associated with all or a portion of the polynucleotide with which it is associated in nature; and/or (2) is linked to a polynucleotide other than that to which it is linked in nature.

In accordance with any aspect of the invention, providing in a eukaryotic cell a candidate peptide functionally linked to a test protein may comprise providing one or more nucleic acid encoding such a candidate peptide and test protein.

In one embodiment, the method further comprises identifying one or more E3 to which the E3-binding peptide binds or is capable of binding.

In another aspect of the invention there is provided a method for determining if a peptide binds or is capable of binding to a ubiquitin protein ligase (E3) and thereby leads to degradation of a test protein, wherein the peptide is between about 7 and 110 amino acids in length, the method comprising:

providing in a eukaryotic cell a candidate peptide functionally linked to a test protein, under conditions enabling ubiquitination of proteins by an E3; and detecting the amount of test protein present in the cell; whereby, a reduced amount of the test protein determines the candidate peptide as a peptide that binds or is capable of binding to an E3 (an E3-binding peptide).

In one embodiment, the method may further comprise identifying the E3-binding peptide. Suitable identification methods may include sequencing for example by next-generation sequencing (NGS) or Sanger sequencing, by PCR, or by mass spectrometry etc. Where the candidate peptide is provided as one of a plurality of candidate peptides, each spatially separated and presented in a defined position (e.g. within an array) for example in a microtiter plate or on a chip, the E3-binding peptide may be identified by reference to its position within the array, following detection of the amount of test protein in the cell (detection being carried out, for example, by microscopy, flow cytometry, elisa or Western blot).

Suitably, the peptide that is capable of binding to a ubiquitin protein ligase (E3) is thereby capable of leading to or recruiting ubiquitination of a test or reporter protein.

In one embodiment of any aspect of the invention, the candidate peptide is between about 7 and 110 amino acids in length, preferably wherein the candidate peptide is about 11 to 46 amino acids in length. In another embodiment the candidate peptide is about 25 to 46 amino acids in length. Suitable candidate peptides for use in accordance with the invention will be known to those skilled in the art.

Suitably the "test" protein or peptide is a target protein. Such a target protein may, for example, be labelled with an antibody, a tag, or may be a fluorescent protein fusion. In other embodiments, the test protein may be a reporter protein. In yet other embodiments, the test protein may be a target-reporter fusion protein. In some embodiments the test protein may comprise a plurality of lysine residues within its native amino acid sequence. In some embodiments the test protein may be genetically engineered to comprise a plurality of lysine residues. Such lysine residues may be present at the N-terminus or the C-terminus of the test protein, or internally within the test protein amino acid sequence.

As referred to herein, "protein", "(poly)peptide" and "peptide" may be used interchangeably.

Suitably the eukaryotic cell is provided with a candidate peptide under conditions enabling ubiquitination of proteins by an E3. In some embodiments, an E3 is the E3 identified in accordance with the invention.

Suitably, in the detection step, the amount of the test, e.g. target or reporter, protein present is measured and compared to a control.

Suitably, a candidate peptide that binds or is capable of binding to an E3 is capable of leading to and/or recruiting ubiquitination of the test, e.g. reporter, protein. Thus the 'candidate peptide' is identified as an E3-binding peptide.

In some embodiments of any aspect of the invention, the amino acid sequence of the E3-binding peptide is not comprised in the amino acid sequences of a known substrate of the E3, such as a native substrate.

In one embodiment, a method in accordance with any aspect of the invention comprises or further comprises identifying the E3-binding peptide (degron). Degron (peptide) as used herein refers to a candidate peptide containing an E3 binding sequence (i.e. an E3-binding peptide) and having the potential to recruit an E3 ligase. When a degron peptide/E3-binding peptide is linked to either (i) a test protein binding moiety e.g. a test protein binding (poly)peptide (thereby forming a PROTAC), or (ii) a test protein itself, the test protein and the E3 ligase are brought into close proximity.

In one embodiment, a method in accordance with any aspect of the invention further comprises using the E3-binding peptide in a screening method against a target protein, for example a therapeutic target protein. Such a screening method may comprise: fusing the E3-binding peptide to each of a plurality of candidate target protein binding peptides in order to produce a peptide-peptide fusion library. This peptide-peptide fusion library may then be screened for the ability to degrade the target protein when introduced into eukaryotic cells under conditions enabling ubiquitination of proteins by an E3. By this method therefore, E3-binding peptides, and target protein binding peptides, may be determined. An E3-binding peptide—target protein binding peptide fusion found to lead to degradation of the target protein in the screen may be used or developed further, for example as a composition for use in treatment of diseases related to the target protein.

In another embodiment, a method in accordance with any aspect of the invention further comprises identifying an E3 to which the E3-binding peptide binds or is capable of binding.

Suitable methods for identifying an E3 will be familiar to those skilled in the art and may include, for example, using techniques such as pull-down, Y2H, Y3-hybrid, or through bioinformatics approaches using databases such IntAct, for example. Identification can be confirmed using a candidate approach with knockdown of a target using shRNA, for example, to confirm that this restores test protein levels.

In another embodiment of any aspect of the invention, the test protein is a reporter protein, a reporter protein fusion, or is functionally linked to a reporter protein, and wherein detecting the amount of test protein present in the cell comprises detecting the amount of reporter protein present in the cell.

In one embodiment, a method in accordance with any aspect of the invention further comprises selecting a cell based on a reduction in the amount of test protein present in the cell. In one embodiment, a method in accordance with any aspect of the invention further comprises selecting a cell based on a reduction in the amount of reporter protein present in the cell, wherein the test protein is a reporter protein, a reporter protein fusion, or is functionally linked to a reporter protein.

In some embodiments, the reduction in the amount of test or reporter protein may be analysed in the absence and presence of a proteasomal inhibitor such as MG132, as described herein, for example, so as to ensure that a low test protein or low reporter signal is caused by degradation of the protein via the UBP system and not by other means (such as low expression, autophagy etc.). Other proteasomal inhibitors will be known to those skilled in the art, and suitably include Bortezomib, Z-LLF-CHO, Lactacystin and inhibitors of specific 20S proteasomal proteolytic functions such as Chymotrypsin-like, Trypsin-like and Caspase-like inhibitors. The terms 'proteasomal inhibitor' and 'proteasome inhibitor' are used interchangeably herein.

In some embodiments, cells for analysis may be separated using fluorescence-activated cell sorting (FACS), or magnetic cell sorting, or may be analysed using a cell proliferation or survival assay.

Suitably, the eukaryotic cell for use in accordance with the method of any aspect or embodiment is a mammalian cell, suitably a human-derived cell.

In some embodiments the test protein comprises a suitable reporter moiety, including, for example, a fluorescent or luminescent protein, or a protein that can be stained with an antibody to be used in a fluorescent or colorimetric readout, or with an affinity tag, a suicide gene, an antibiotic resistance marker or an enzyme.

In one embodiment, the candidate peptide is functionally linked to the test protein, optionally via a peptide linker. In another embodiment, the amino acid sequence of the test protein and/or the optional linker comprises a plurality of lysine residues.

In other embodiments, the candidate peptide functionally linked to the test protein is a hybrid polypeptide or comprises at least one hybrid polypeptide. Hybrid polypeptide as used herein refers to a polypeptide containing domains from more than one source. Suitably, the hybrid polypeptide includes a domain being the candidate peptide, a domain being the test protein and, if present, a domain being the optional peptide linker, thereby providing the candidate peptide functionally linked to the test protein. The hybrid polypeptide may include a domain being a test protein that is linked, suitably through a covalent interaction (for example as a fusion protein generated by genetic fusion), to a domain being the candidate peptide, optionally via a peptide linker. In some embodiments, the linker has a length of between about 1 and 10 amino acids. In some embodiments, at least 2, 3, 4, 5 or 6 amino acids of the test protein and/or the optional linker may be lysine residues.

Flexible linkers may be used when the linked domains require movement. They usually consist of small non-polar (e.g.: Gly) or polar (eg: Ser, Thr) amino acids, where the small size provides flexibility (Chen et al., 2013 Adv Drug Deliv Rev. October 15; 65(10): 1357-1369). Any suitable flexible linker may be used, with the nature and length appropriate to the entities concerned. In some cases rigid linkers may be preferred, as they can assist with providing protein separation. Rigid linkers have a secondary structure. One of the most common rigid linkers is $(EAAAK)_n$ (where n is the number of repeats) which adopts an α-helical structure (Arai et al., (2001) Protein Eng. August; 14(8): 529-32). Other rigid linkers may include proline rich sequences such as $(XP)_n$, where X is any amino acid but preferentially Ala (A), Lys (K) or Glu (E), where the proline provides conformational constraint (Chen at al., 2013).

In other embodiments, the hybrid polypeptide includes a domain being the candidate peptide, a domain being a test protein binding (poly)peptide and, if present, a domain being the optional linker, wherein, when the hybrid polypeptide and the test protein are present in the cell, the hybrid polypeptide binds to the test protein via the test protein binding (poly)peptide; thereby providing the candidate peptide functionally linked to the test protein.

In another embodiment, the test protein comprises a protein associated with a disease, disorder or condition when expressed or over-expressed in a eukaryotic cell. Suitably, the protein of interest is one selected from a class of proteins selected from the group consisting of: members of an oncogenic pathway; viral host factors; viral proteins; misfolded proteins; aggregating proteins; toxic proteins; proteins involved in immune recognition, immune response or auto-immunity; shuttle proteins.

The candidate peptide, the test protein, the test protein binding (poly)peptide and/or the hybrid polypeptide in accordance with any aspect of the invention may be provided by expressing in the eukaryotic cell one or more nucleic acid molecule encoding the candidate peptide, the test protein, the test protein binding (poly)peptide and/or the hybrid polypeptide. Suitably, the nucleic acid sequences encoding the candidate peptide, the test protein, the test protein binding (poly)peptide and/or the hybrid polypeptide may be encompassed in different plasmids/vectors such that transfection of a eukaryotic cell with each plasmid/vector will result in each component (peptide/polypeptide/protein) being produced by the cell, when it is cultured in suitable conditions. In other embodiments, a single plasmid/vector may comprise a combination of one or more nucleic acid sequence encoding the candidate peptide, the test protein, the test protein binding (poly)peptide and/or the hybrid polypeptide, such that transfection of a eukaryotic cell with this plasmid/vector will result in each component being produced by the cell, when it is cultured in suitable conditions. In other embodiments, an entire fusion protein coding sequence comprising: (i) the candidate peptide coding sequence, and (ii) the test protein coding sequence or the test protein binding (poly)peptide coding sequence, suitably joined by the optional peptide linker coding sequence, may be provided in one plasmid/vector, such that transfection of a eukaryotic cell with this plasmid/vector will result in the entire fusion protein being produced by the cell, when it is cultured in suitable conditions.

In another aspect, the invention provides a nucleic acid molecule for use in a method in accordance with the invention. Suitable nucleic acid molecules may comprise a construct encoding the candidate peptide (functionally) linked to the test protein or the test protein binding (poly) peptide. Where the candidate peptide is one of a plurality of candidate peptides, for example a library of candidate peptides, a plurality of nucleic acid molecules may be provided, each comprising the coding sequence for one candidate peptide. In another aspect, the invention provides a vector comprising the nucleic acid in accordance with the invention.

Suitably, the E3-binding peptide is identified from the nucleotide sequence of the nucleic acid molecule encoding the (relevant) candidate peptide. Suitable methods of identifying the nucleotide sequence will be known to those skilled in the art and include next-generation sequencing (NGS), Sanger sequencing, microarray and similar hybridisation-based approaches.

In a method in accordance with any aspect or embodiment of the invention, a reduced amount of the test protein is determined by comparison to a control, to a threshold and/or to a reference distribution. Suitably, a reduced amount of test protein is determined by comparison to a control. In one embodiment, the test protein comprises a first reporter protein. Suitably, where the test protein comprises a first reporter protein, the control may comprise a control eukaryotic cell comprising the test protein comprising the first reporter protein but not functionally linked to the candidate peptide. Alternatively, where the test protein comprises a first reporter protein the control may comprise a second reporter protein present in the eukaryotic cell that is not functionally linked to the candidate peptide. In some embodiments, the first reporter protein and the second reporter protein are fluorescent proteins having different excitation and/or emission frequencies. Suitable reporter proteins will be known to those skilled in the art and include but are not limited to GFP, EGFP, RFP, DsRed, mCherry etc.

In another embodiment, the control may comprise a control eukaryotic cell comprising the candidate peptide functionally linked to the test protein, but under conditions that prevent ubiquitination of proteins by an E3, preferably wherein the conditions comprise treating the control eukaryotic cell with a proteasome inhibitor, e.g. MG132.

In a further embodiment of any aspect of the invention, the candidate peptide functionally linked to the test protein is provided as a member of a library of candidate peptides, suitably each functionally linked to the test protein. Suitably, the candidate peptides comprised in the library have a length of between about 7 and 110 amino acids, preferably between about 11 and 46 amino acids, and have an amino acid sequence being a region of a sequence selected from the amino acid sequence of a naturally occurring protein of one or more organisms; wherein the library comprises nucleic acids that encode for a plurality of at least 5,000 different such peptides, and optionally wherein the amino acid sequence of each of at least 50 of such peptides is a sequence region of the amino acid sequence of a different protein of a plurality of different such naturally occurring proteins. In another embodiment, the candidate peptides comprised in the library may be derived from one or more starting peptides from which systematic variants have been generated. The candidate peptides may be derived from proteins known to bind to E3 ligases. In other embodiments the library may be comprised of random amino acid sequences. Suitable candidate peptide libraries for use in accordance with the invention will be known to those skilled in the art.

Suitably each candidate peptide functionally linked to the reporter protein, is provided by a library of nucleic acids capable of expression in the eukaryotic cell. In other embodiments, each nucleic acid of the library encodes for a hybrid polypeptide; wherein the hybrid polypeptide includes a domain being a candidate peptide, a domain being the test protein and, if present, a domain being the optional linker. Suitably, the hybrid polypeptide includes a domain being the candidate peptide, a domain being the reporter protein binding (poly)peptide and, if present, a domain being the optional linker.

In another aspect of the invention, there is provided a library of (e.g. synthetic) nucleic acids, each nucleic acid comprising a coding region of defined nucleic acid sequence encoding for a peptide being a hybrid polypeptide comprising: (i) a candidate peptide being a member of a library of candidate peptides; (ii) a test protein or a test protein binding (poly)peptide; and (iii) an optional linker, in each case independently as recited in any aspect or embodiment of the invention.

In another aspect, the invention provides a library of (e.g. synthetic) nucleic acids, each nucleic acid comprising a coding region of defined nucleic acid sequence encoding for a peptide being an E3-binding peptide, suitably wherein the library represents between about 20 and 2,000 different E3-binding peptides, that each bind to or are capable of binding to one or more E3.

In another aspect, the invention provides a library of peptides, wherein the peptides are the hybrid polypeptide encoded by the library of nucleic acids in accordance with the invention or are the E3-binding peptides encoded by the library of nucleic acids in accordance with the invention.

Suitably in a library in accordance with any aspect or embodiment of the invention, the individual members thereof are in a pooled format. For example, a "pooled format" (or "pooled form") includes those where the individual members (or subset of members) thereof are in admixture with other members (or subsets); for example, a solution (or dried precipitate thereof) of such members contained in a single vessel, or a population of host cells containing recombinant vectors according to the present invention.

In another embodiment, the individual members of a library in accordance with the invention are spatially separated. A "spatially separated" library can be considered as a library in which a plurality of members (or sub-sets of members) of the library are physically separated, suitably in an ordered manner, from each other. Examples of a spatially separated library include those where individual members (or sub-sets of members) are comprised in individual wells of one or more mictrotitre plates, are arrayed on a solid surface or are bound (in an ordered manner) to a silicon wafer. In another embodiment, individual members (or sub-sets of members) in the library in accordance with the invention are each individually addressable; that is they can be retrieved (e.g. without undue searching or screening) from the library. Suitable methods for addressing or interrogating the library in accordance with the invention may include Next Generation Sequencing (NGS), PCR etc. Also, when the library is present in a spatially separated format (or form), the individual members (or sub-sets of members) may be "individually addressable" by knowing the spatial location of the applicable individual member (or sub-set). In either of these embodiments, use of a computer program, data file or database (such as those utilising a computer-readable medium or data-processing system, of the invention) can facilitate the retrieval of individual members (or sub-sets of members) that are comprised in an individually addressable library of the invention.

In another aspect, there is provided a population of cells transformed with the library of nucleic acids in accordance with the invention, or with the nucleic acid molecule or vector in accordance with the invention, or expressing the library of peptides in accordance with the invention. Suitable cells include eukaryotic cells, such as mammalian cells, human cells e.g. HEK293A cells, immortalized cells and primary cells (ie fibroblasts, glial cells, neuronal cells). Suitable cells for use in accordance with the invention will be known by those skilled in the art. In one embodiment, the host cells will be suitable for transient expression. In another embodiment, host cells will be those cells which are capable of forming stable cell lines.

In another aspect, the invention provides a container or carrier comprising a library in accordance with any aspect or embodiment of the invention or a population of cells in accordance with any aspect or embodiment of the invention. Suitable containers include a microtiter plate or a silicon carrier.

In another aspect, the invention provides a computer-readable medium having information stored thereon comprising: (i) the nucleic acid sequences comprised in the library in accordance with any aspect or embodiment of the invention and/or (ii) the amino acid sequences comprised in the library of peptides in accordance with any aspect or embodiment of the invention.

In another aspect, there is provided a data-processing system for storing and/or processing information comprising: (i) the nucleic acid sequences comprised in the library of nucleic acids in accordance with any aspect or embodiment of the invention and/or (ii) the amino acid sequences comprised in the library of peptides in accordance with any aspect or embodiment of the invention.

Suitably the computer-readable medium, or the data-processing system in accordance with the invention further comprises information identifying the E3 or E3s that each peptide being an E3-binding peptide is capable of binding.

Suitably, in one aspect, the invention provides a method for determining if a peptide binds or is capable of binding to a ubiquitin protein ligase (E3) and thereby leads to degradation of a test protein, wherein the peptide is between about 7 and 110 amino acids in length, the method comprising:
  providing in a eukaryotic cell a candidate peptide functionally linked to a test protein, under conditions enabling ubiquitination of proteins by an E3; and
  detecting the amount of test protein present in the cell; whereby, a reduced amount of the test protein determines the candidate peptide as a peptide that binds or is capable of binding to an E3 (an E3-binding peptide);
  wherein the candidate peptide is functionally linked to the test protein and is or comprises at least one hybrid polypeptide; and wherein the hybrid polypeptide includes a domain being the candidate peptide, and a domain being a test protein binding (poly)peptide, and wherein, when the hybrid polypeptide and the test protein are present in the cell, the hybrid polypeptide binds to the test protein via the test protein binding (poly)peptide, thereby providing the candidate peptide functionally linked to the test protein.

In some embodiments, the candidate peptide is functionally linked to the test protein via a peptide linker, wherein the hybrid polypeptide includes a domain being the linker.

In some embodiments, a reduction in the amount of test protein present in the cell is analysed in the presence of a proteasome inhibitor (e.g. MG132).

In view of the above, it will be appreciated that the present invention also relates to the following items:

1. A method for identifying a peptide that binds or is capable of binding to a ubiquitin protein ligase (E3), wherein the peptide is between about 7 and 110 amino acids in length, the method comprising:
   providing in a eukaryotic cell a candidate peptide functionally linked to a test protein, under conditions enabling ubiquitination of proteins by an E3;
   detecting the amount of test protein present in the cell, whereby a reduced amount of the test protein determines the candidate peptide as a peptide that binds or is capable of binding to an E3 (an E3-binding peptide); and
   identifying the E3-binding peptide.

2. The method according to item 1, the method further comprising:
   identifying one or more E3 to which the E3-binding peptide binds or is capable of binding.

3. A method for determining if a peptide binds or is capable of binding to a ubiquitin protein ligase (E3) and thereby leads to degradation of a test protein, wherein the peptide is between about 7 and 110 amino acids in length, the method comprising:
   providing in a eukaryotic cell a candidate peptide functionally linked to a test protein, under conditions enabling ubiquitination of proteins by an E3; and
   detecting the amount of test protein present in the cell; whereby, a reduced amount of the test protein determines the candidate peptide as a peptide that binds or is capable of binding to an E3 (an E3-binding peptide).

4. The method of item 3 further comprising identifying the E3-binding peptide.

5. The method of item 3 or item 4 further comprising identifying an E3 to which the E3-binding peptide binds or is capable of binding.

6. The method of any preceding item, wherein the test protein is a reporter protein, a reporter protein fusion, or is functionally linked to a reporter protein, and wherein detecting the amount of test protein present in the cell comprises detecting the amount of reporter protein present in the cell.

7. The method of item 6 further comprising selecting a cell based on a reduction in the amount of reporter protein present in the cell.

8. The method of item 7, wherein selecting the cell is by separation using fluorescence-activated cell sorting (FACS).

9. The method of any preceding item wherein the eukaryotic cell is a mammalian cell.

10. The method of any preceding item, wherein the test protein comprises a fluorescent or luminescent protein.

11. The method of any preceding item, wherein the candidate peptide is functionally linked to the test protein, optionally via a peptide linker.

12. The method of any preceding item, wherein the amino acid sequence of the test protein and/or the optional peptide linker comprises a plurality of lysine residues.

13. The method of any preceding item, wherein the candidate peptide functionally linked to the test protein is or comprises at least one hybrid polypeptide.

14. The method of item 13, wherein the hybrid polypeptide includes a domain being the candidate peptide, a domain being the test protein and, if present, a domain being the optional peptide linker, thereby providing the candidate peptide functionally linked to the test protein.

15. The method of item 14, wherein the hybrid polypeptide includes a domain being the test protein that is covalently linked to a domain being the candidate peptide, optionally via a peptide linker.

16. The method of item 14 or item 15 wherein at least 2, 3, 4, 5 or 6 amino acids of the test protein and/or of the optional linker are lysine residues.

17. The method of item 13, wherein the hybrid polypeptide includes a domain being the candidate peptide, a domain being a test protein binding (poly)peptide and, if present, a domain being the optional linker, wherein, when the hybrid polypeptide and the test protein are present in the cell, the hybrid polypeptide binds to the test protein via the test protein binding (poly)peptide, thereby providing the candidate peptide functionally linked to the test protein.

18. The method of any preceding item, wherein the test protein comprises a protein associated with a disease, disorder or condition when expressed or over-expressed in a eukaryotic cell.

19. The method of item 18, wherein the test protein is one selected from a class of proteins selected from the group consisting of: members of an oncogenic pathway; viral host factors; viral proteins; mis-folded proteins; aggregating proteins; toxic proteins; proteins involved in immune recognition, immune response or auto-immunity; shuttle proteins.

20. The method of any preceding item, wherein the candidate peptide, the test protein, the test protein binding (poly)peptide and/or the hybrid polypeptide is provided by expressing in the eukaryotic cell one or more nucleic acid encoding the candidate peptide, the test protein, the test protein binding (poly)peptide and/or the hybrid polypeptide.

21. The method of item 20, wherein the E3-binding peptide is identified from the nucleotide sequence of the nucleic acid molecule encoding the candidate peptide.

22. The method of any preceding item, wherein a reduced amount of the test protein is determined by comparison to a control, to a threshold and/or to a reference distribution.

23. The method of item 22, wherein a reduced amount of the test protein is determined by comparison to a control, and wherein the test protein comprises a first reporter protein.

24. The method of item 23, wherein the control comprises a control eukaryotic cell comprising the test protein comprising the first reporter protein not functionally linked to the candidate peptide.

25. The method of item 23, wherein the control comprises a second reporter protein present in the eukaryotic cell and not functionally linked to the candidate peptide.

26. The method of item 25, wherein the first reporter protein and the second reporter protein are fluorescent proteins, suitably having different excitation and/or emission frequencies.

27. The method of item 22 or 23, wherein the control comprises a control eukaryotic cell comprising the candidate peptide functionally linked to the test protein, under conditions that prevent ubiquitination of proteins by an E3, preferably wherein the conditions comprise treating the control eukaryotic cell with a proteasome inhibitor.

28. The method of any preceding item, wherein the candidate peptide functionally linked to the test protein is provided as a member of a library of candidate peptides, suitably each functionally linked to the test protein.

29. The method of item 28, wherein the candidate peptides comprised in the library have a length of between about 7 and 110 amino acids, and have an amino acid sequence being a region of a sequence selected from the amino acid sequence of a naturally occurring protein of one or more organisms; wherein the library comprises a plurality of at least 5,000 different such peptides, and wherein the amino acid sequence of each of at least 50 of such peptides is a sequence region of the amino acid sequence of a different protein of a plurality of different such naturally occurring proteins.

30. The method of item 28 or 29, wherein the library of candidate peptides, suitably each functionally linked to the test protein, is provided by a library of nucleic acids capable of expression in the eukaryotic cell.

31. The method of item 30, wherein each nucleic acid of the library encodes for a hybrid polypeptide; wherein the hybrid polypeptide includes a domain being a candidate peptide, a domain being the test protein and, if present, a domain being an optional linker.

32. The method of item 30, wherein each nucleic acid of the library encodes for a hybrid polypeptide; wherein the hybrid polypeptide includes a domain being a candidate peptide, a domain being the test protein binding (poly)peptide and, if present, a domain being the optional linker.

33. A library of nucleic acids, each nucleic acid comprising a coding region of defined nucleic acid sequence encoding for a peptide being a hybrid polypeptide comprising: (i) a candidate peptide being a member of a library of candidate peptides; (ii) a test protein or a test protein binding (poly)peptide; and (iii) an optional linker, in each case independently as recited in any one of items 1 to 32.

34. A library of nucleic acids, each nucleic acid comprising a coding region of defined nucleic acid sequence encoding for a peptide being an E3-binding peptide, suitably wherein the library represents between about 20 and 500 different E3-binding peptides that each bind to or are capable of binding to one or more E3.

35. A library of peptides, wherein the peptides are the hybrid polypeptide encoded by the library of nucleic acids of item 33 or are the E3-binding peptides encoded by the library of nucleic acids of item 34.

36. The library of nucleic acids of item 33 or item 34, or the library of peptides of item 35, wherein the individual members thereof are in a pooled format.

37. The library of nucleic acids of item 33 or item 34, or the library of peptides of item 35, wherein the individual members thereof are spatially separated.

38. A population of cells transformed with the library of nucleic acids of item 33 or item 34, or expressing the library of peptides of item 35.

39. A container or carrier comprising: (i) the library of nucleic acids of any one of items 33, 34, 36 or 37; (ii) the library of peptides of any one of items 35 to 37, and/or (iii) the population of cells of item 38.

40. The container or carrier of item 39 that is a microtiter plate or a silicon carrier.

41. A computer-readable medium having information stored thereon comprising: (i) the nucleic acid sequences comprised in the library of nucleic acids of any one of items 33, 34, 36 or 37 and/or (ii) the amino acid sequences comprised in the library of peptides of any one of items 35 to 37.

42. A data-processing system for storing and/or processing information comprising: (i) the nucleic acid sequences comprised in the library of nucleic acids of any one of items 33, 34, 36 or 37 and/or (ii) the amino acid sequences comprised in the library of peptides of any one of items 35 to 37.

43. The computer-readable medium of item 41, or the data-processing system of item 42, further comprising information identifying the one or more E3 to which each peptide being an E3-binding peptide binds or is capable of binding.

DETAILED DESCRIPTION

Certain aspects and embodiments of the invention will now be illustrated by way of example and with reference to the following Figures and Examples.

FIGURES

FIG. 1. (A) PROTAC molecules are composed of a target-binding moiety, a linker, and an E3 ligase binding moiety. In this example, TNKS2 and VHL were chosen as the target protein and E3 ligase, respectively. The amino acid sequences of the two targeting moieties (peptides) of the PROTAC are shown. The triangle (amino acid sequence ALAPYIP (SEQ ID NO: 2)) represents the E3 ligase binding moiety, and the small rounded square (amino acid sequence LPHLQRSPPDGQSFRS (SEQ ID NO: 1)) represents the target protein binding moiety (B) Expression of the PROTAC (poly)peptide shown in A, and consequent binding of the moieties to TNKS2 and VHL, leads to TNKS2 and VHL E3 ligase being brought into close proximity. VHL E3 ligase recruits ubiquitin conjugating, or E2, enzymes and then catalyzes the transfer of ubiquitin molecules from E2 onto lysine residues of TNKS2. This polyubiquitination of TNKS2 targets it for proteasomal degradation. Because the PROTAC peptide itself escapes ubiquitination, it is left intact to bind and deplete more TNKS2 proteins in the cell.

Figure 2:
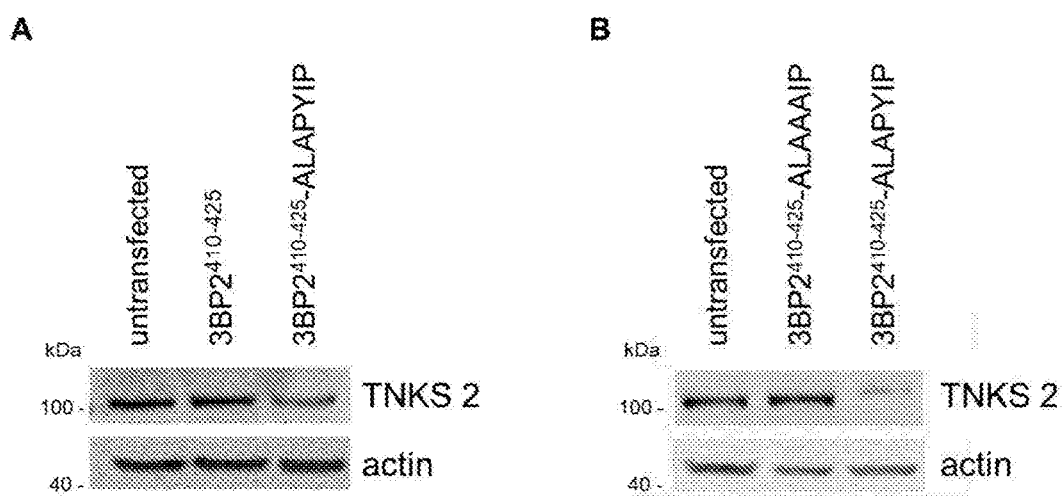

FIG. 2. Demonstration of the importance of the E3 ligase binding peptide sequence for degradation. HEK293A cells were transfected with either no DNA, plasmids encoding for 3BP2$^{410-425}$-ALAPYIP (the full PROTAC as set out in SEQ ID NO: 4) or in FIG. 2A: 3BP2$^{410-425}$ (the PROTAC lacking the E3 ligase binding peptide as set out in SEQ ID NO: 5 (FIG. 2A)) or in FIG. 2B: 3BP2$^{410-425}$-ALAAAIP (the PROTAC with a mutated E3 ligase binding peptide as set out in SEQ ID NO: 6). 20 hours after transfection, cells were harvested and analyzed by Western Blotting. Membranes were probed with primary antibodies against TNKS2 (Abcam ab155545), or actin (Abcam ab179467) as a loading control. After the addition of HRP-conjugated secondary antibodies, protein signals were detected by chemiluminescence. Expression of 3BP2$^{410-425}$-ALAPYIP leads to decreased levels of TNKS2 compared to all control samples.

Figure 3A:
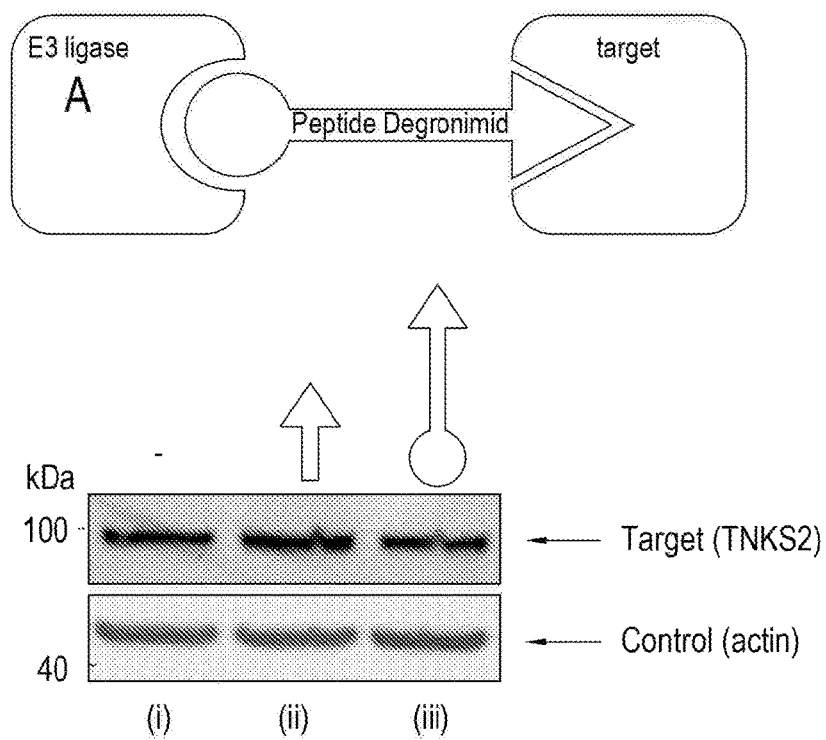
Figure 3B:
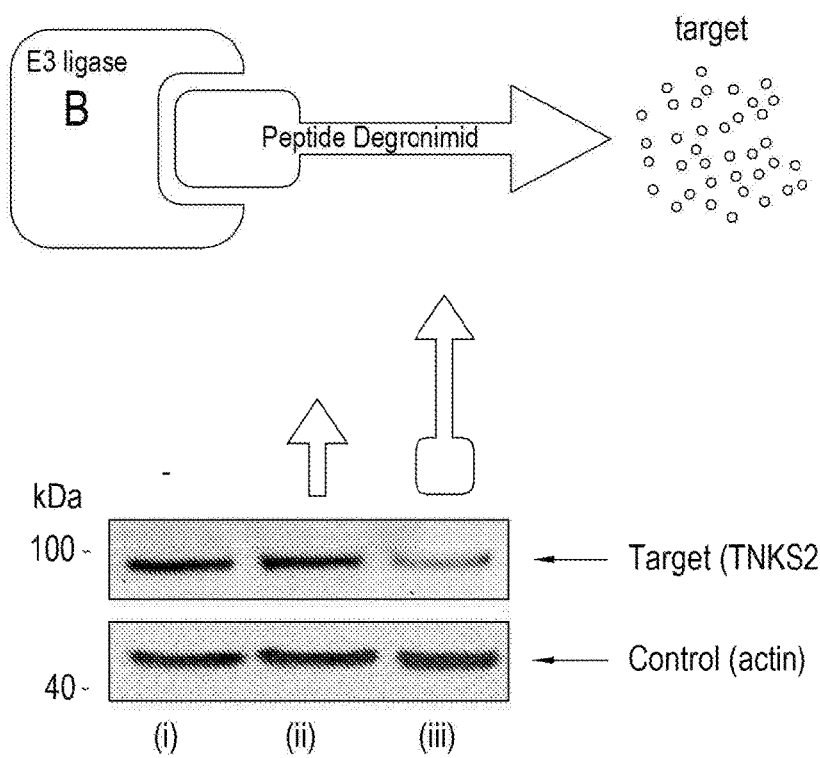

FIG. 3. Demonstration of the selectivity of the E3 ligases for a given target. Cells were transfected with one of (i) no DNA, (ii) a plasmid encoding only a target (TNKS2) binding sequence, or (iii) a plasmid encoding the TNKS2 binding sequence fused to an E3 binding sequence (either a Keap1 binding sequence or a VHL binding sequence). FIG. 3A shows the results for Keap1 ('E3 ligase A'); FIG. 3B shows the results for VHL ('E3 ligase B'). Detection of TNKS2 levels by Western blotting showed that recruitment of Keap1 (FIG. 3A) did not lead to proteasomal degradation of that target, whereas recruitment of VHL did (FIG. 3B).

Figure 4A:
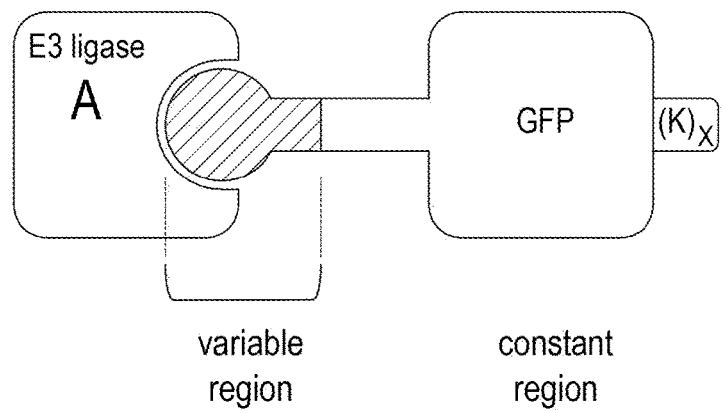
Figure 4B:
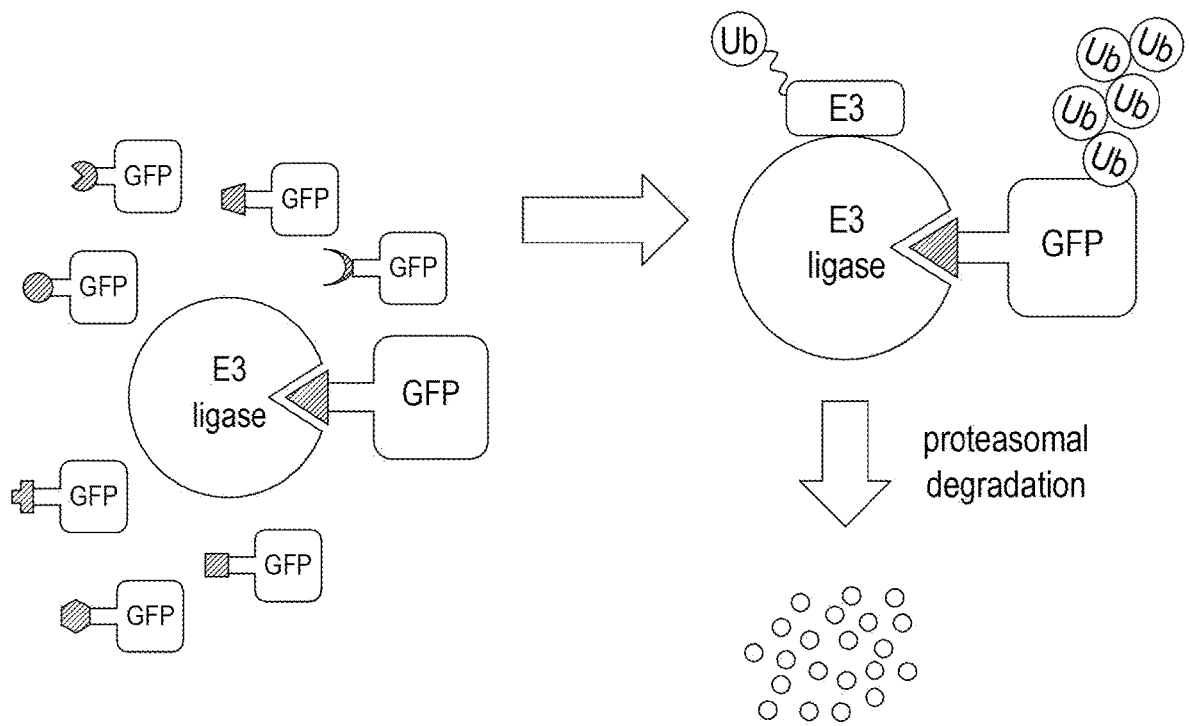

FIG. 4. FIG. 4A. A library of candidate peptides was linked to a generic target to screen for functional E3 recruitment (represented by notional E3 ligase "A"). Each element of the library contained a variable region (candidate peptide) derived from first degree interactors of E3 ligases, linked to a test protein comprising a generic target sequence (a fluorescent protein (GFP) fused to a lysine-rich region ((K)$_x$)). FIG. 4B. Overview of the screening method. The candidate peptide-GFP library shown in FIG. 4A was expressed in HEK293A cells. When the reporter (GFP) is linked to a candidate peptide capable of binding an E3 ligase (i.e. a degron), the reporter and E3 ligase come into proximity. This subsequently leads to the recruitment of an E2 enzyme and the transfer of ubiquitin molecules onto Lysine (K) residues of the reporter, targeting the latter for proteasomal degradation. Cells expressing such peptides (those that engage a functional E3 ligase complex), have lower GFP levels compared to cells expressing peptides which cannot bind E3s.

Figure 5:
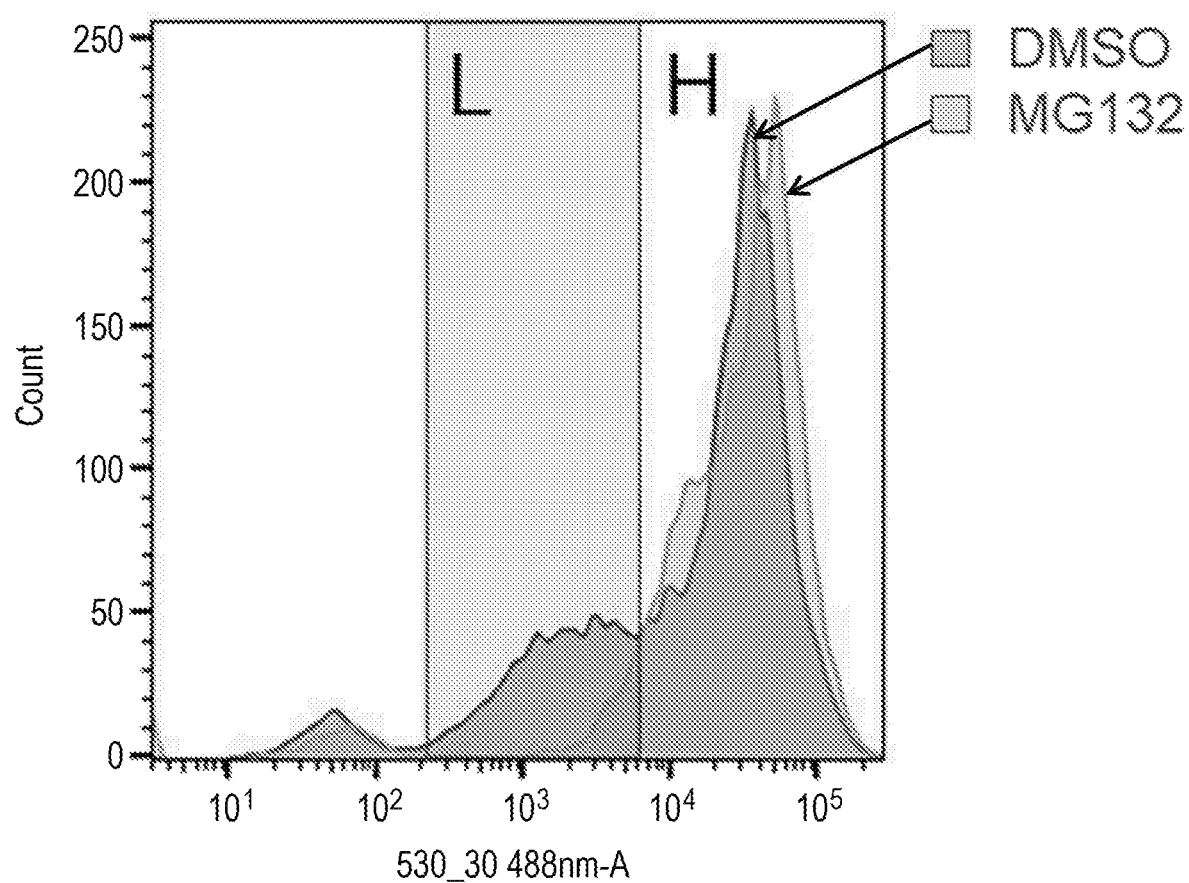

FIG. 5. A library of 300,000 candidate peptides coupled to a fluorescent protein reporter was transduced into HEK293A cells using lentivirus and either treated with DMSO (control) or with the proteasome inhibitor MG132. The cells showing decreased fluorescence and therefore expression of GFP with DMSO which shifts (increased GFP fluorescence) upon treatment with MG132 are considered as hits from the screen. The X-axis shows fluorescence intensity (AU, excitation 488 nm, emission 530/30 nm; L indicates low GFP, H indicates high GFP), the Y axis shows count of events (cells detected) upon FACS sorting.

Figure 6:
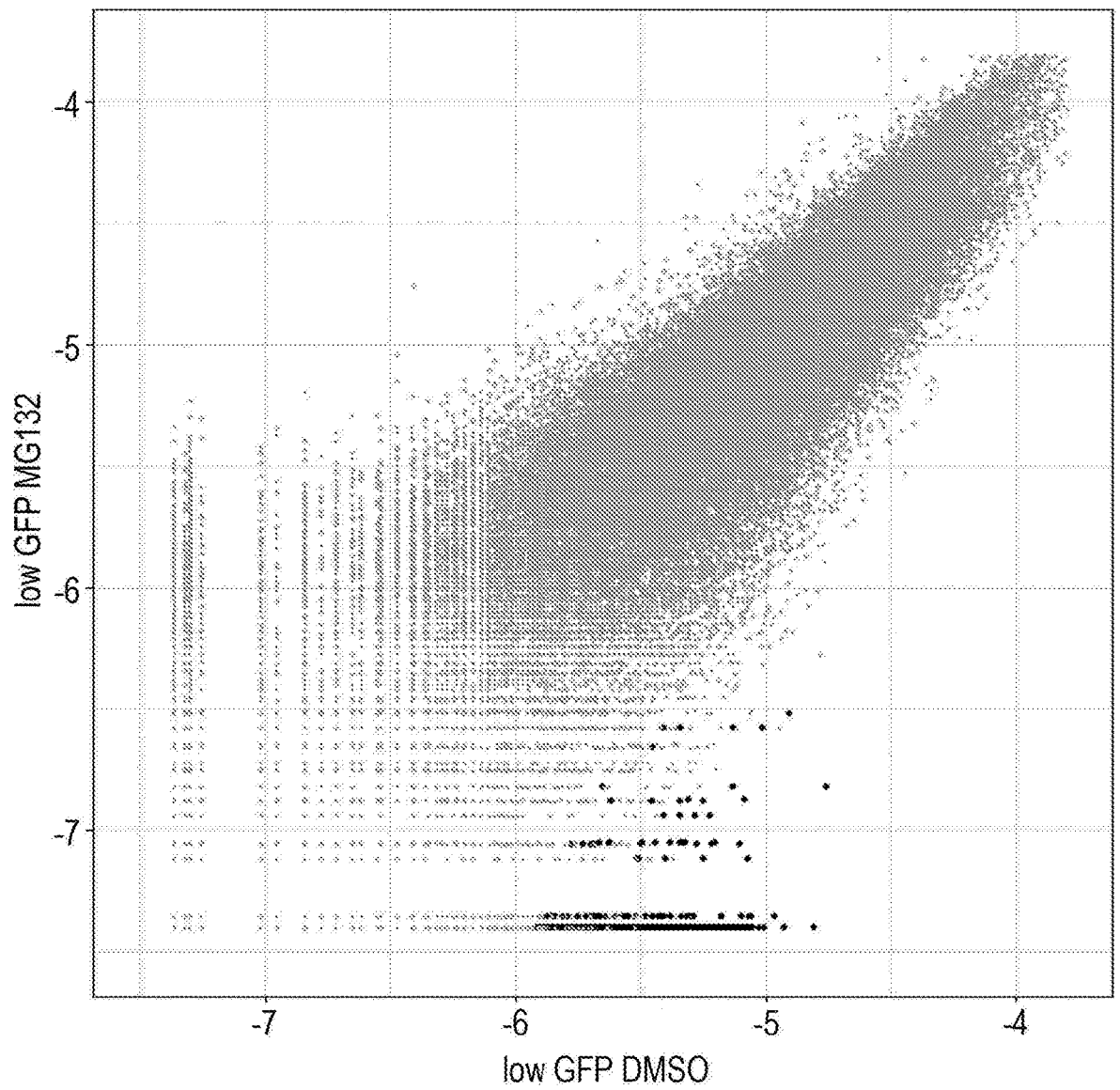

FIG. 6. NGS data analysis and filtering of peptide data highlights the candidate peptides able to recruit E3 ligases to selectively degrade the GFP target. Shown in the figure is the "Low GFP" population, where a set of 875 hit peptides (black circles) show increased GFP fluorescence with a cutoff of at least 20 fold between DMSO and MG132 treatment conditions, whilst also being above a minimal fluorescence (expression) threshold.

Figure 7:
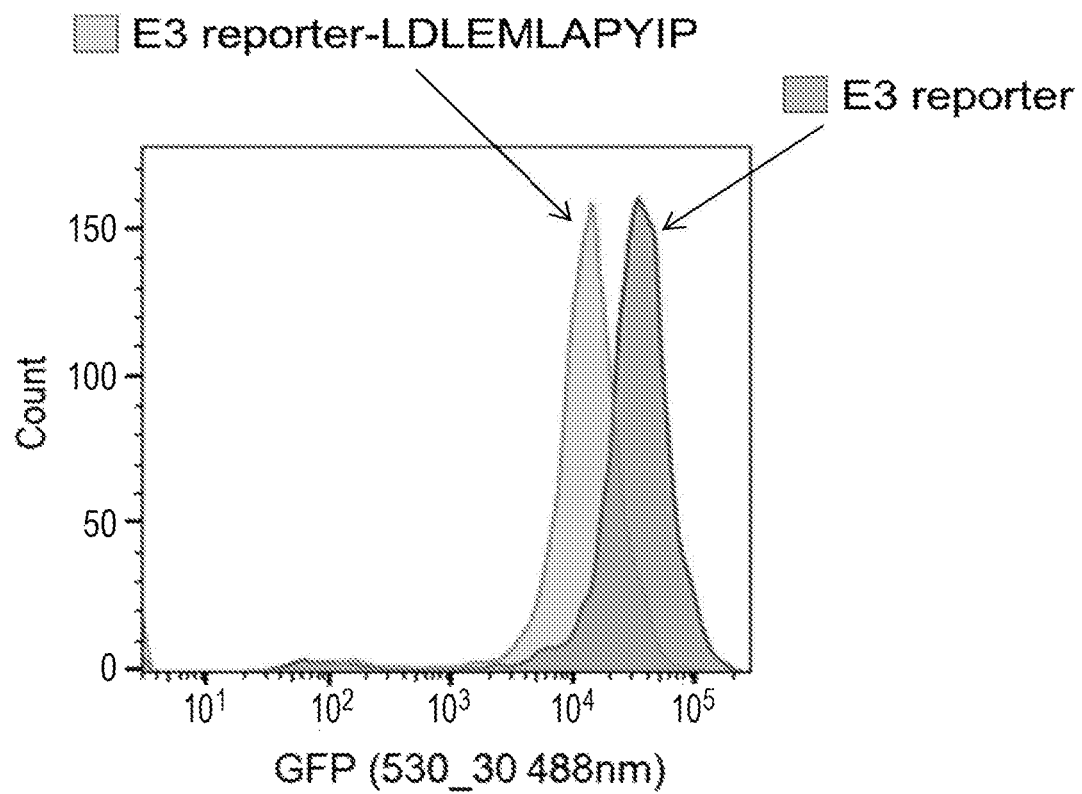

FIG. 7. A construct encoding a peptide comprising the VHL binding region of HIF1α (LDLEMLAPYIP (SEQ ID NO: 9)) fused to a fluorescent reporter (GFP) via a linker was generated. Cells expressing this fusion construct (E3 reporter-LDLEMLAPYIP) and cells expressing the untagged reporter (E3 reporter), were separately subjected to FACS. E3 reporter-LDLEMLAPYIP cells showed reduced GFP fluorescence levels compared to E3 reporter cells, as the LDLEMPLAPYIP peptide functionally tags the reporter to VHL E3 ligase, bringing the E3 ligase into proximity with the GFP fusion construct, and directing it towards proteasomal degradation. The X-axis shows fluorescence intensity (AU, excitation 488 nm, emission 530/30 nm), the Y axis shows count of events (cells detected).

Figure 8A:
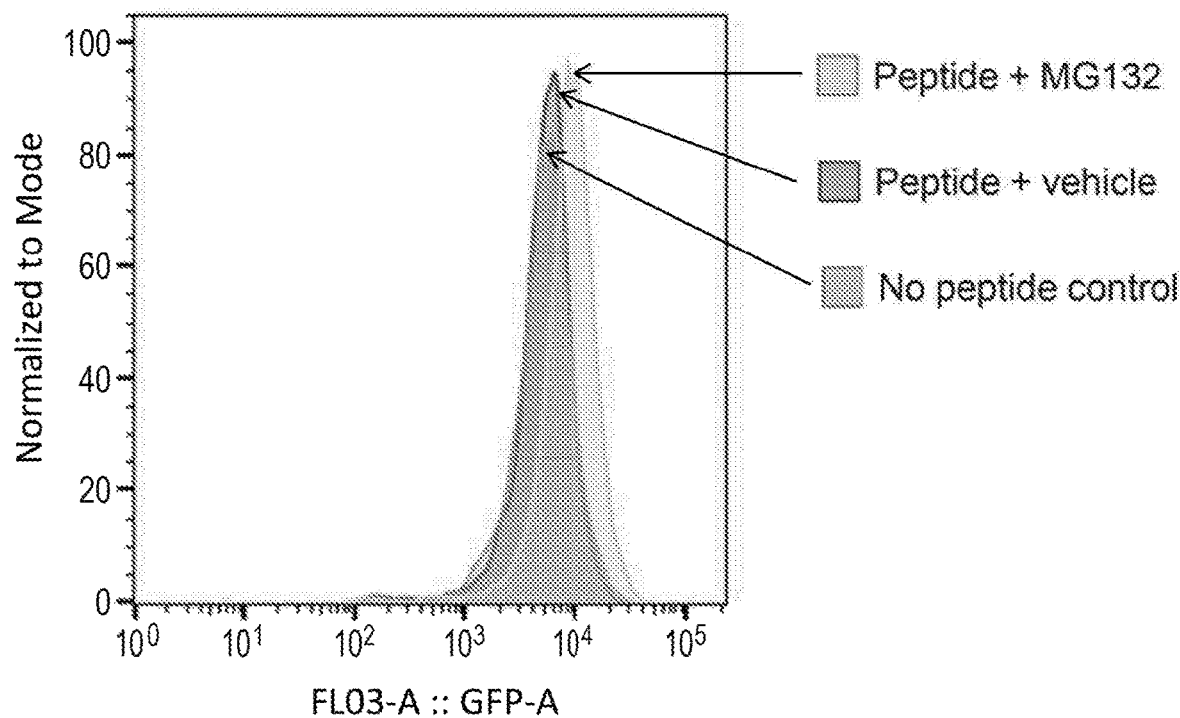
Figure 8B:
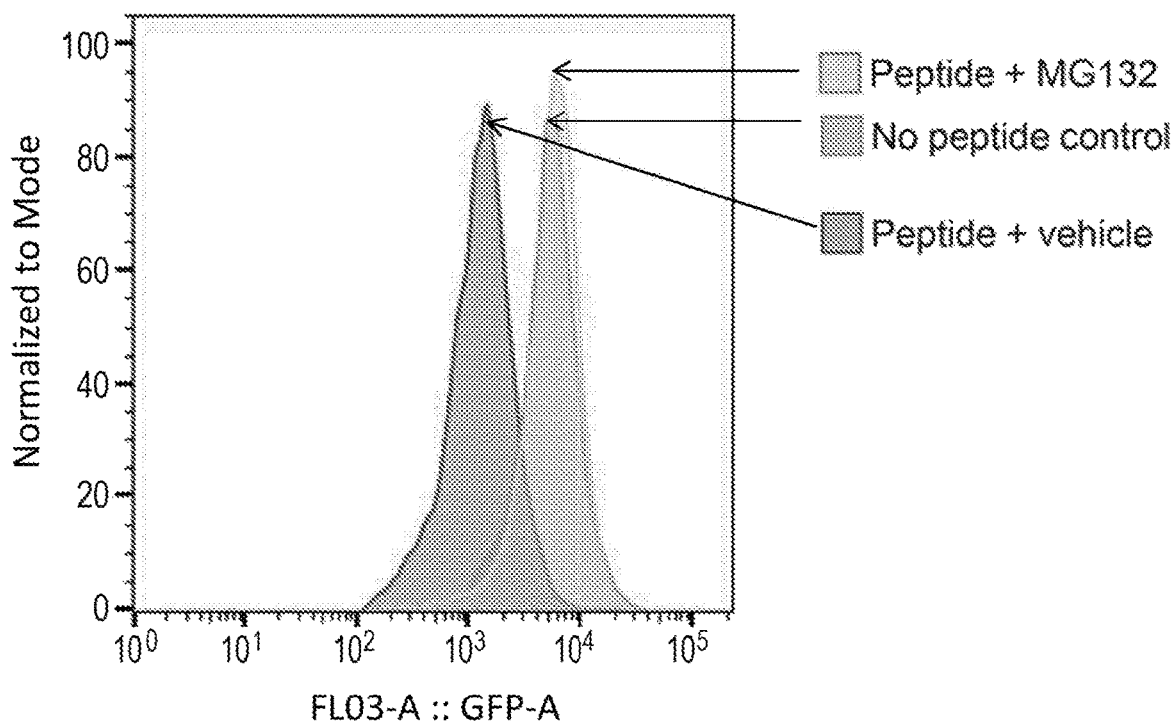

FIG. 8. FACS data showing that a candidate peptide 'hit' (a degron/E3-binding peptide) identified by the screening method functionally recruits E3 ligases to selectively degrade GFP. HEK293A cells were transduced using lentivirus with plasmids encoding either GFP alone ('no peptide control'), or GFP tagged with a candidate peptide. FIG. 8A shows results where the candidate peptide was a negative control peptide; FIG. 8B shows results where the candidate peptide was a validated hit (Hit (#1)) from the screening method. Cells transduced with a tagged GFP construct were either untreated ('Peptide+vehicle') or were treated with proteasome inhibitor MG132 ('Peptide+MG132') before FACS analysis. The results indicate that peptide Hit (#1) is able to functionally recruit E3 ligases to selectively degrade GFP.

Figure 9:
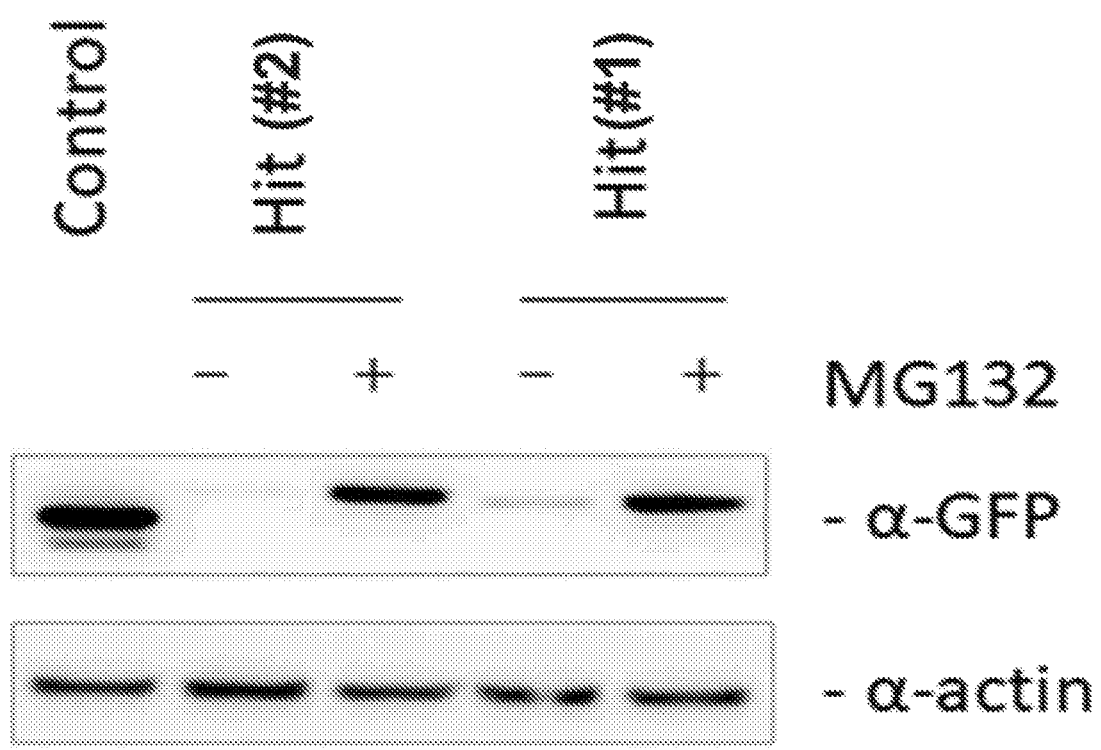

FIG. 9. Western blot data showing selective degradation of GFP by candidate peptide 'hits' (degrons) identified by the screening method. Plasmids encoding for GFP alone ('Control'), or GFP tagged with either one of the validated degron peptides (Hit (#1) or Hit (#2)) were transduced into HEK293A cells using lentivirus. Cells expressing tagged GFP were either untreated (−) or treated with the proteasome inhibitor MG132 (+). Following Western blot, membranes were probed with either anti-GFP primary antibody (α-GFP), or anti-actin primary antibody (α-actin) as a loading control.

Figure 10:
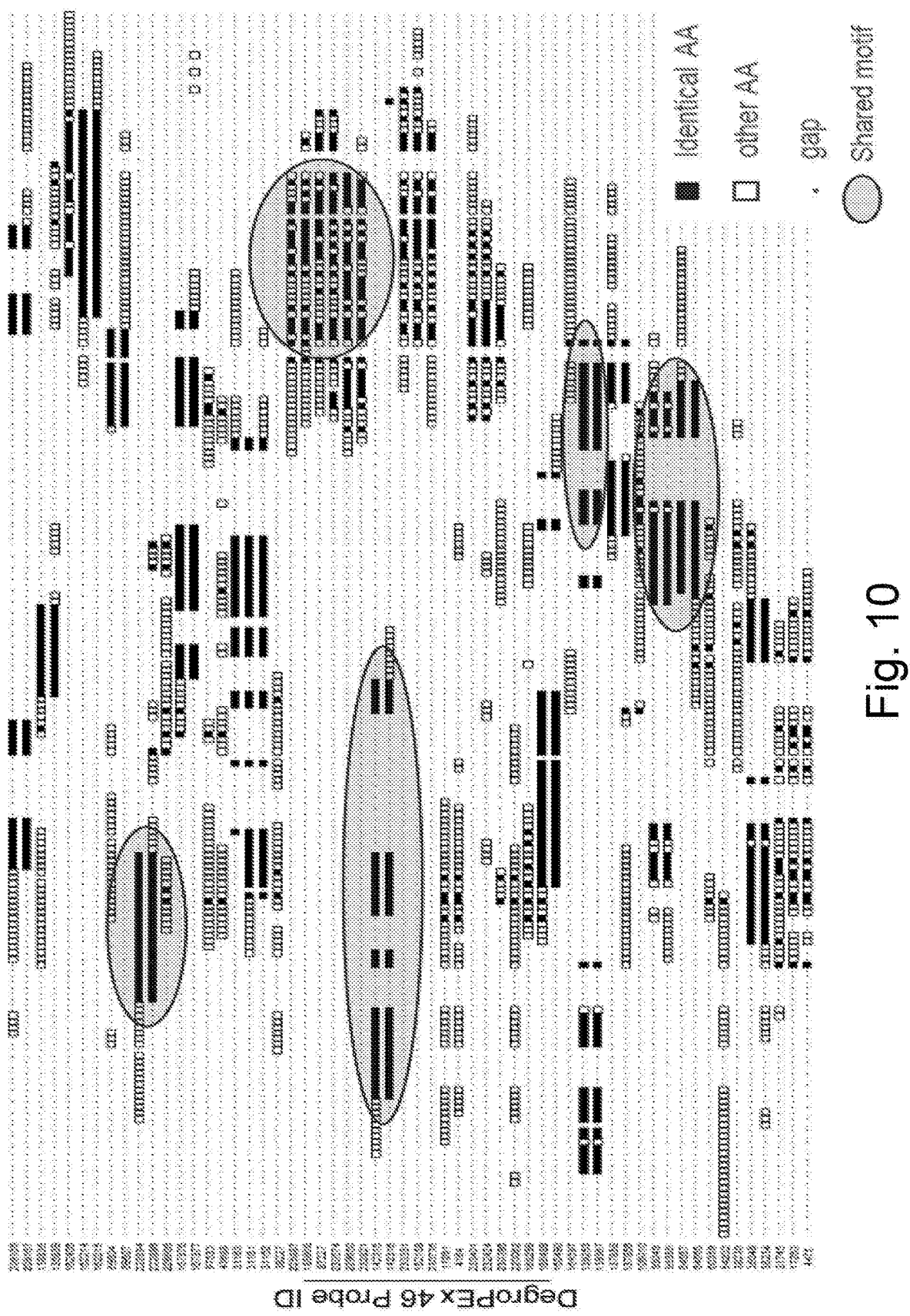

FIG. 10. A clustal alignment of amino acid sequences of hit candidate peptides (degrons; E3-binding peptides) identified by the screening method, showing common motifs.

Figure 11:
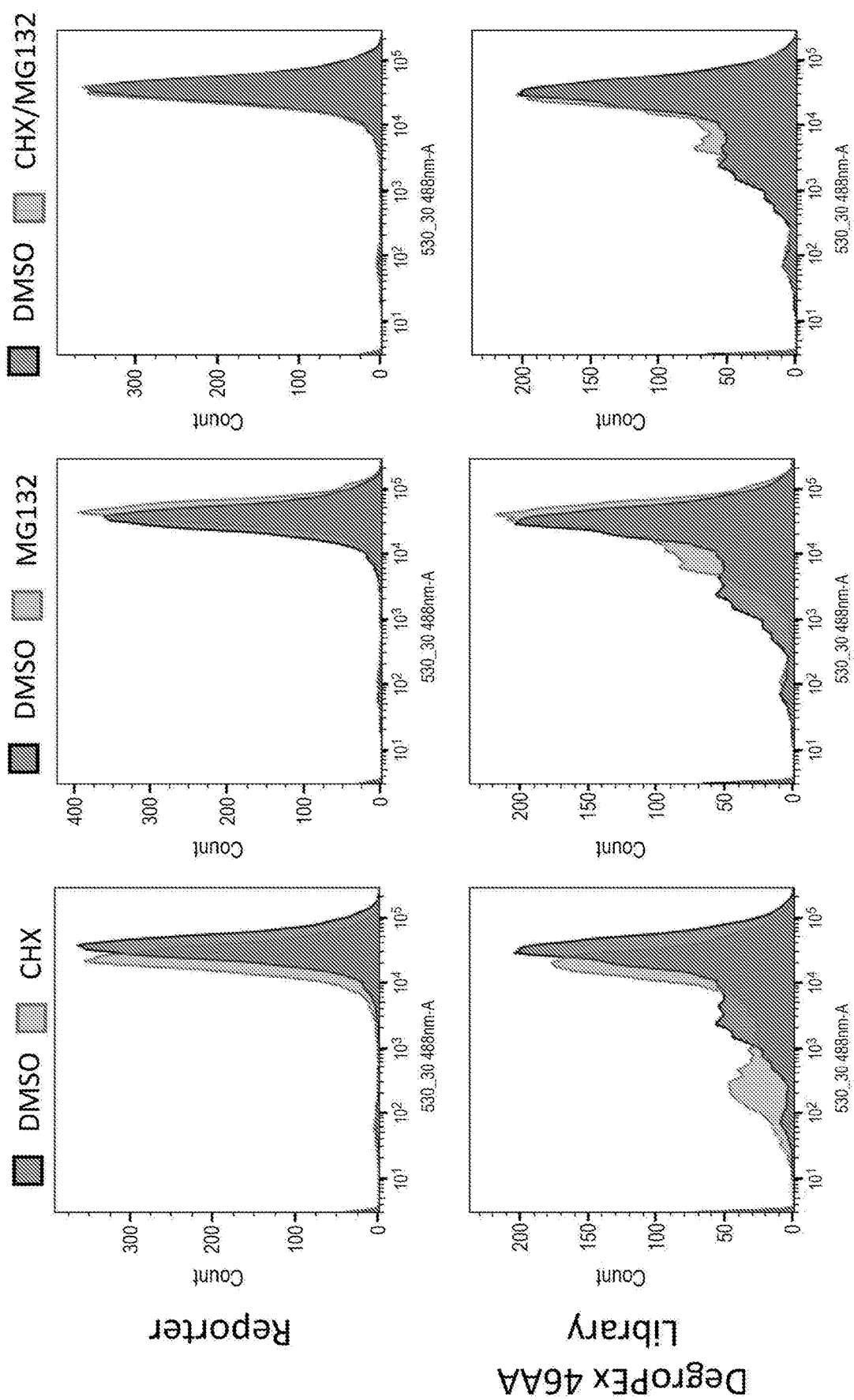

FIG. 11. FACS data showing that the reduction in fluorescence of cells expressing GFP tagged with a hit peptide was not due to a block in translation. Cells were infected with a GFP reporter-only construct ('E3 reporter 2', FIGS. 11A-C) or with a DegroPEx library of 46AA peptides fused to GFP ('E3 reporter 2+DegroPEx 46AA', FIGS. 11D-F). Cells were treated with vehicle alone (DMSO), cycloheximide (CHX), MG132, or both CHX and MG132 ('CHX+ MG132'). For the vehicle-only treatment, cells transfected with the library of peptide-GFP fusion proteins showed a distinct low-fluorescence population in comparison with cells transfected with the GFP reporter-only construct. MG132 treatment of the library-infected group reverted the fluorescence signal towards the reporter-only fluorescence profile (FIG. 11E). CHX treatment resulted in a decrease in the overall fluorescence signal (FIGS. 11A and 11D), resulting in fluorescence of the library-infected group shifting to a very low fluorescence measure (FIG. 11D).

Figure 12:
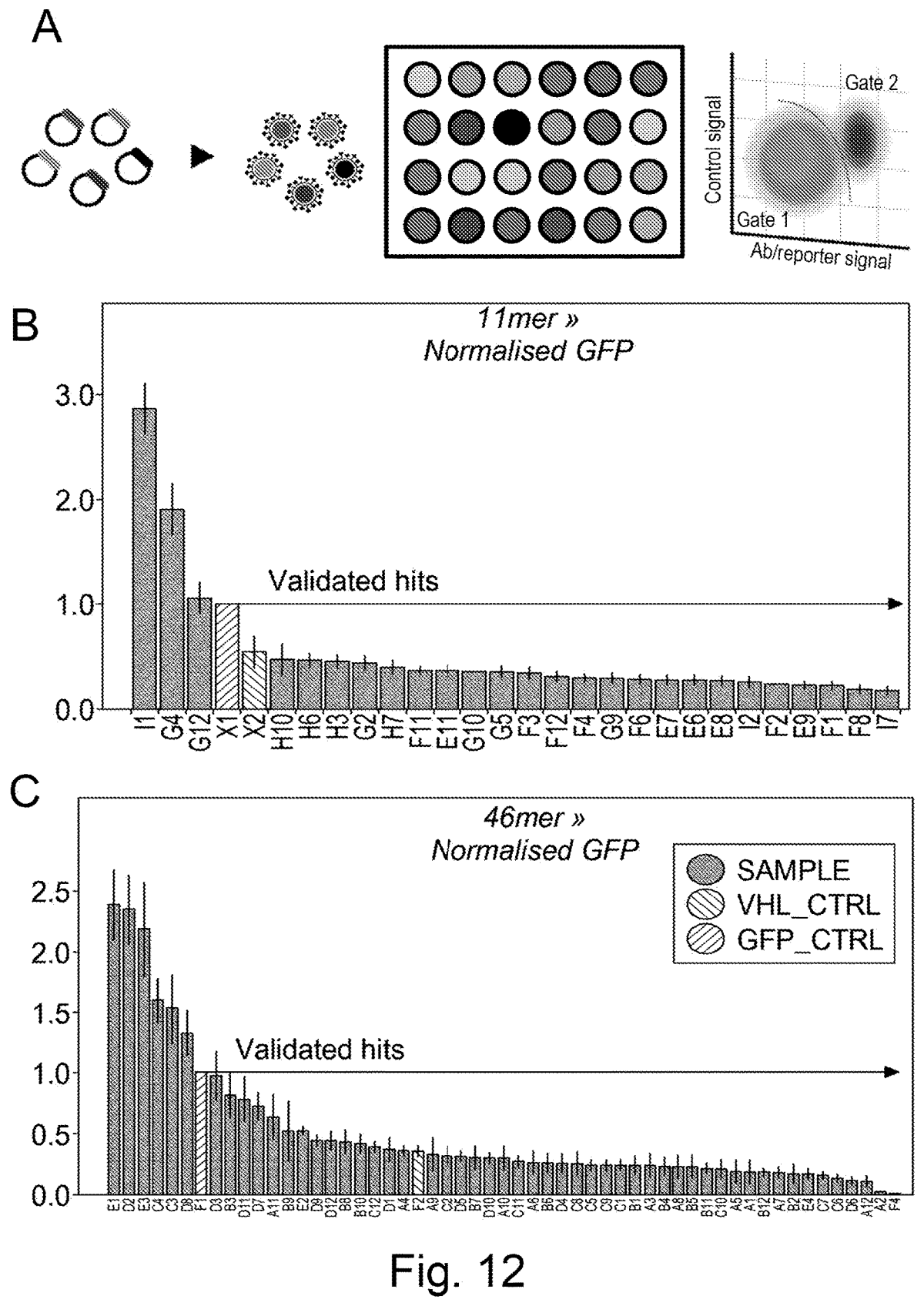

FIG. 12. Validation of screening hits. FIG. 12A is a schematic of the screening process. FIGS. 12B and 12C show charts of modal fluorescence intensities for peptide hits identified by reporter screens. 12B shows the results for 11AA peptide hits, 12C shows the results for 46AA peptide hits. For each chart, a reporter-only construct ('GFP-CTRL', X1 on 12B and F1 on 12C) was used to normalize the hit peptide intensities. From each reporter screen, any peptides which gave a normalized modal intensity of less than 1.0 were considered validated. A von Hippel-Landau ('VHL_C-TRL') ligand fused to the GFP reporter was included as a positive control (X2 on 12B, F2 on 12C).

Figure 13A:
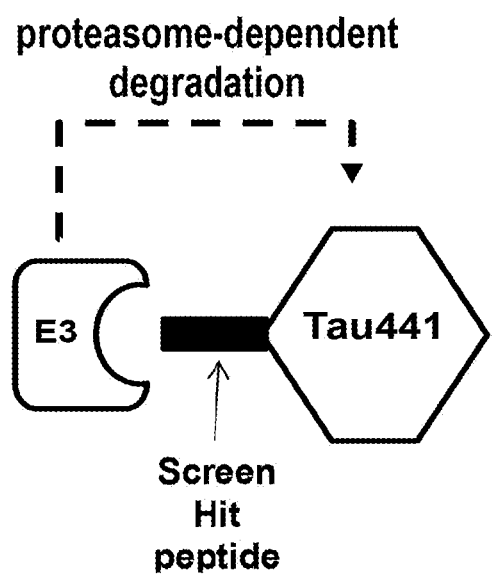
Figure 13B:
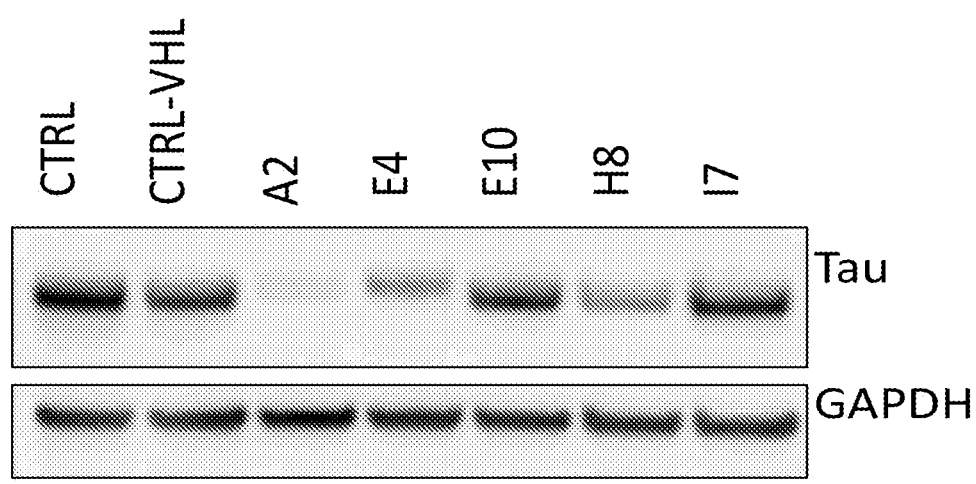

FIG. 13. Alternative screen demonstrating diverse substrate activity of E3-binding peptides identified. Hit peptides from a GFP screen were instead fused to Tau441, FIG. 13A illustrates a schematic of the Tau441-peptide fusion and predicted ubiquitination by an E3 ligase leading to proteasome-dependent degradation. The Tau441-peptide fusion proteins were transiently transfected into cells. Total protein from the incubated cells was separated by gel electrophoresis followed by western blotting using anti-Tau and anti-GAPDH antibodies (FIG. 13B). Cells expressing untagged Tau441 'CTRL' and Tau441 fused to a VHL ligand were also tested. For peptide hits A2, E4 and H8 the level of Tau protein was significantly reduced compared to that of the housekeeping protein GAPDH, demonstrating that these peptides can direct the proteasomal degradation of Tau and GFP via an E3 ubiquitin ligase.

FIG. 14. Demonstration of ubiquitin binding to reporter protein fused to hit peptides. Selected hit peptides A2 and E4 identified from previous screens were individually fused to GFP and used to transform cells. Cells were also transformed with GFP alone (Reporter), or GFP tagged with a VHL ligand ('VHL'). Cells were incubated with (+) and without (−) the presence of MG132. Immunoprecipitations (IP) of whole cell lysates were conducted using an anti-GFP antibody ('IP: αGFP'), followed by western blotting using one of an anti-ubiquitin antibody ('WB: αUb'), an anti-K48 linkage-specific ubiquitin antibody ('WB: αK48') or an anti-GFP antibody ('WB: αGFP'). Reporter alone showed no ubiquitination or degradation, when detected with either anti-ubiquitin or anti-GFP antibody. The hit peptide-GFP fusions showed K48 (degron-specific) ubiquitination, to varying extents. MG132 enhanced levels of ubiquitinated protein for the hit peptide-GFP fusion proteins. The asterisk indicates a background band in hit E4.

E3 ubiquitin ligases (E3s) regulate cellular homeostasis, including cell cycle regulation, cell survival, cell differentiation, DNA repair pathways and innate and acquired immunity. In disease, such as cancer, a number of these proteins such as MDM2, BRCA1, and Von Hippel-Lindau tumor suppressor are dysregulated.

Known E3 ubiquitin ligases include E3A, mdm2, Anaphase-promoting complex (APC), UBR5 (EDD1), SOCS/BC-box/eloBC/CUL5/RING, LNXp80, CBX4, CBLL1, HACE1, HECTD1, HECTD2, HECTD3, HECTD4, HECW1, HECW2, HERC1, HERC2, HERC3, HERC4, HERC5, HERC6, HUWE1, ITCH, NEDD4, NEDD4L, PPIL2, PRPF19, PIAS1, PIAS2, PIAS3, PIAS4, RANBP2, RNF4, RBX1, SMURF1, SMURF2, STUB1, TOPORS, TRIP12, UBE3A, UBE3B, UBE3C, UBE3D, UBE4A, UBE4B, UBOX5, UBR5, WWP1, WWP2, Parkin.

A degron is a portion of a protein that is used by E3 ubiquitin ligases to target said protein for degradation. Known degrons include short amino acid sequences, structural motifs and exposed amino acids (often lysine or arginine) located anywhere within the protein. Posttranslational modifications, including phosphorylation, represent the most common mechanism for control of substrate recognition by E3 ligases. Other forms of posttranslational modification include acetylation, sumoylation or glycosylation.

The E3 ubiquitin ligase recruits ubiquitin conjugating, or E2, enzymes and then catalyzes the transfer of ubiquitin molecules from E2 onto lysine residues of the target protein, or, to a preceding ubiquitin moiety on the target protein. This results in the formation of poly-ubiquitin chains, or multi- or mono-ubiquitylation events, each of which have a different functional outcome. Poly-ubiquitination targets substrates for destruction by the proteasome.

PROTACs are hetero-bifunctional compounds with bivalent selectivity. They consist of:
1) a ligand (moiety) to the target protein or peptide
2) a ligand (moiety) to the E3 ubiquitin ligase
3) a linker connecting the two ligands.

The binding of PROTACs to their E3 ubiquitin ligase and target protein substrates brings the E3 ubiquitin ligase and target protein into close proximity to one another as a ternary complex, thus facilitating E3-mediated ubiquitination of the target protein. As the two ligands do not interact, the linker determines the relative orientation of the two proteins in the ternary complex. In most cases, the E3 ligase has not evolved to bind the protein substrate, therefore the interaction critically depends on the specificity of the bridging PROTAC to both the E3 ubiquitin ligase and the protein substrate. The PROTAC essentially acts as a catalyst for the degradation of the target protein as it is able to dissociate from the binding proteins after ubiquitination of the target protein and is able to repeat its action on the next target protein.

The term PROTAC was first coined by Crews and his colleagues in 2001, where their synthesised compound PROTAC-1 contained a $SCF^{\beta-TRCP}$ binding phosphopeptide and small-molecule ovalicin that covalently bound MetAP-2. Degradation of MetAP-2 using *Xenopus* egg cell lysate was dependent upon PROTAC-1 (Sakamoto, K. et al. (2001). Protacs: Chimeric molecules that target proteins to the Skp1-Cullin-F box complex for ubiquitination and degradation. *PNAS.* 8(15):8554-9).

As cell permeability is an essential criterion for use therapeutically, cell permeable PROTACs were later developed. These exist as small peptides or small molecules, both of which are sufficiently small enough to pass through the cell membrane. These are often based on known interactors with E3 ubiquitin ligases such as Hypoxia-inducible factor 1. Once peptide ligands (moieties) to the E3 ubiquitin ligase and ligands (moieties) to the target protein are identified, the PROTAC is generated by the expression of the moieties conjugated together through use of a linker. Alternatively, the moieties may be replaced by small molecule mimics.

The current challenges and limitations of PROTACs include their high molecular weight and polar surface areas, which are associated with poor cell permeability, bioavailability and tissue distribution. Furthermore, the published PROTAC molecules all rely on the utilisation of a small number of ubiquitin E3 ligases, each with different degradation efficiencies. As there are an estimated 500-1000 human ubiquitin E3 ligases, it is likely that as yet, unidentified ubiquitin E3 ligases could exist with degradation efficacies vastly superior to those in current use.

Furthermore, the interaction of a particular E3 ligase with a particular polypeptide or protein does not guarantee proteasomal degradation of that substrate. Therefore combining a degron known to recruit a particular E3 with a peptide known to bind a target of interest does not always result in a functional PROTAC. The development of a high-throughput functional screen capable of identifying a large repertoire of degrons, that recruit one or more E3 ubiquitin ligases thereby accessing a greatly increased pool of usable E3s, is of great interest.

EXAMPLES

Example 1

Demonstration of E3-Directed Proteasomal Degradation of a Target Via an Endogenously-Expressed PROTAC An endogenously expressed PROTAC to specifically degrade Tankyrase 2 (TNKS2) was developed. A plasmid encoding for a peptide composed of a target (TNKS2) binding moiety, a linker, and an E3 ligase binding moiety was expressed in HEK293A cells. The target binding moiety peptide was chosen by searching the Protein Data Bank for protein-peptide structures. A short peptide corresponding to residues 410-425 of human SH3 domain-binding protein 2 (3BP2)(LPHLQRSPPDGQSFRS) as set out in SEQ ID NO: 1, is known to bind to TNKS2 (residues 20-800), with 500 nM affinity in fluorescence polarization binding assays (Guettler et al., 2011. Cell). This was selected as the target binding moiety (peptide or ligand). A peptide derived from HIF1α (ALAPYIP) as set out in SEQ ID NO: 2, which binds to Von Hippel-Lindau (VHL), the substrate recognition portion of a Cullin-RING (CLR) E3 ligase, was used as the E3 ligase binding moiety. FIG. 1 illustrates the overview of the proof of concept experiment.

Method

A DNA construct encoding for the TNKS2 binding sequence ($3BP2^{410-425}$) at the N-terminus as set out in SEQ ID NO: 1, a GGGGSS linker as set out in SEQ ID NO: 3, and the E3 binding sequence (ALAPYIP) as set out in SEQ ID NO: 2, at the C-terminus was cloned into pMOST25 vector (the full PROTAC as set out in SEQ ID NO: 4). pMOST25 is a lentiviral vector based on pCDH EF1a (System Biosciences) where the promoter was swapped for CMV and the MCS replaced by a new cassette with flanking NGS primer sites. Control constructs which (i) lacked the ALAPYIP E3 binding sequence ($3BP2^{410-425}$) as set out in SEQ ID NO: 5 or (ii) contained a double mutation which is known to disrupt HIF1α-VHL interaction ($3BP2^{410-425}$-ALAAAIP) as set out in SEQ ID NO: 6 were similarly cloned (Table 1). Neither control construct can bind to the E3 ligase and therefore there should be no change in the level of TNKS2 when cells are transduced with these. HEK293A cells were collected 20 hours after transfection, and levels of TNKS2 target protein were assessed by Western Blot (FIG. 2). Membranes were probed with primary antibodies against TNKS2 (Abcam ab155545), or actin (Abcam ab179467) as a loading control. Expression of the DNA encoding the full PROTAC (comprising the TNKS2 binding sequence, the linker and the E3 ligase binding sequence ($3BP2^{410-425}$-ALAPYIP)) lead to markedly decreased levels of TNKS2, compared to cells transfected with no DNA or either of the two control constructs $3BP2^{410-425}$ and $3BP2^{410-425}$-ALAAAIP. This demonstrates that expression of a DNA encoding for a peptide with a target binding sequence, a linker, and an E3 ligase binding sequence (e.g. $3BP2^{410-425}$-ALAPYIP) can efficiently and rapidly degrade the target protein in cells.

TABLE 1

Amino acid sequence of peptides expressed in Example 1

| Construct | Construct function | Amino acid sequence |
|---|---|---|
| $3Bp2^{410-425}$-linker | Control lacking E3 binding sequence | MGLPHLQRSPPDGQSFRSLEGGGGSS (SEQ ID NO: 5) |
| $3Bp2^{410-425}$-linker-ALAPYIP | PROTAC (TNKS2 and VHL binding) | MGLPHLQRSPPDGQSFRSLEGGGGSSAALAPYIP (SEQ ID NO: 4) |
| $3Bp2^{410-425}$-linker-ALAAAIP | Control with double mutation in E3 binding sequence | MGLPHLQRSPPDGQSFRSLEGGGGSSAALAAAIP (SEQ ID NO: 6) |

Example 2

Demonstration of the Selectivity of E3 Ligases for a Given Target

HEK293A cells were transfected with either (i) no DNA, or plasmids encoding for (ii) $3BP2^{410-425}$ (LPHLQR-SPPDGQSFRS; the TNKS2 binding sequence) plus linker as set out in SEQ ID NO: 5, or (iii) either $3BP2^{410-425}$ linked to LDPETGEYL (the TNKS2 binding sequence plus a Kelch-like ECH-associated protein 1 (Keap1) binding sequence) as set out in SEQ ID NO: 7 or $3BP2^{410-425}$ linked to ALAPYIP (the TNKS2 binding sequence plus a VHL binding sequence) as set out in SEQ ID NO:4. Keap1 and VHL are depicted by E3 ligase A or B, respectively, in FIG. 3.

20 hours after transfection, cells were harvested and analyzed by Western Blotting. Membranes were probed with primary antibodies against TNKS2 (Abcam ab155545), or actin (Abcam ab179467) as a loading control. After the addition of HRP-conjugated secondary antibodies, protein signals were detected by chemiluminescence. TNKS2 levels were unaffected by expression of 3BP2$^{410\text{-}425}$-LDPET-GEYL (SEQ ID NO: 7) indicating that Keap1 (i.e. E3 ligase A) is unable to lead to TNKS2 target degradation (FIG. 3A). However, 3BP2$^{410\text{-}425}$-ALAPYIP peptide led to TNKS2 degradation (FIG. 3B). Thus, VHL (i.e. E3 ligase B) can efficiently functionally degrade TNKS2 target. This demonstrates that E3 ligases have substrate selectivity and not all E3 ligases can be exploited to degrade any given target. Indeed, there is a need to uncover many moieties which bind to a variety of E3 ligases in order to fully exploit the therapeutic potential of PROTACs to degrade many diverse targets.

TABLE 2

Amino acid sequence of peptides expressed in Example 2

| Construct | Construct function | Amino acid sequence |
|---|---|---|
| 3Bp2$^{410\text{-}425}$-linker | Control lacking an E3 binding sequence | MGLPHLQRSPPDGQSFRSLEGGGGSS (SEQ ID NO: 5) |
| 3Bp2$^{410\text{-}425}$-linker-LDPETGEYL | PROTAC (TNKS2 and Keap1 binding) | MGLPHLQRSPPDGQSFRSLEGGGGSSLDPETGEYL (SEQ ID NO: 7) |
| 3Bp2$^{410\text{-}425}$-linker-ALAPYIP | PROTAC (TNKS2 and VHL binding) | MGLPHLQRSPPDGQSFRSLEGGGGSSAALAPYIP (SEQ ID NO: 4) |

Example 3

Screening for Peptides which Functionally Recruit E3 Ligases

A screen was developed to look for peptides (degrons) which can bind to E3 ligases and therefore initiate degradation of a GFP reporter. FIG. 4A illustrates the E3 reporter library polypeptides, expressed from the E3 reporter library constructs, each polypeptide comprising: an N-terminal Lysine-rich region (depicted as (K)$_x$), GFP (constant region), and a variable region comprising a candidate peptide derived from the "DegroPEx" library at the C-terminus.

The Lysine-rich region was derived from human nitric oxide synthase (NOS1) and serves as a target for ubiquitination by E3 ligases as it contains a large number of Lysine residues. The two DegroPEx libraries each consist of 300,000 constructs encoding peptides derived from proteins known to bind to E3 ligases, one library consisting of peptides 11 amino acids in length, the other consisting of peptides 46 amino acids in length. To screen for candidate peptides (degrons) that can functionally recruit E3 ligases, cells infected with the E3 reporter-library constructs were sorted by fluorescence-activated cell sorting (FACS) according to their GFP fluorescence levels. Cells expressing E3 reporter library polypeptides comprising functional degron peptides recruited an E3 ligase, which in turn polyubiquitinated the Lysine-rich region of the E3 reporter polypeptide and directed the whole E3 reporter polypeptide to the proteasome (FIG. 4B), resulting in decreased GFP fluorescence levels compared to cells expressing E3 reporter library polypeptides with candidate peptides that did not function as E3-binding peptides.

Screen Method

The E3 reporter library construct was derived from a pMOST25-Lysine-rich region-emGFP vector. The configuration used in the screen was:

5'-KOZAC-ATG-Lys-region-XbaI-emGFP-EcoRI-ePCR/NGS fwd primers-BamHI-candidate peptide library sequence-STOP-3'

The region underlined (ePCR/NGS fwd primers) is where the primers bind for the sequencing of the candidate peptide sequence. This also acts as a "linker" between the GFP and the peptide library.

When transcribed, these constructs result in the E3 reporter library polypeptides as represented in FIG. 4A from C-terminus to N-terminus orientation, and having the following amino acid sequence (SEQ ID NO 8):

MATKDQLFPLAKEFIDQYYSSIKKFGSKAHMERLEEVNKEIDTTSGGGS
RVSKGEELFTGVVPILVELDGDVNGHKFSVSGEGEGDATYGKLTLKFIC
TTGKLPVPWPTLVTTFTYGVQCFARYPDHMKQHDFFKSAMPEGYVQERT
IFFKDDGNYKTRAEVKFEGDTLVNRIELKGIDFKEDGNILGHKLEYNYN
SHKVYITADKQKNGIKVNFKTRHNIEDGSVQLADHYQQNTPIGDGPVLL
PDNHYLSTQSALSKDPNEKRDHMVLLEFVTAAGITLGMDELYKEFGGGS
AIHAVLTSINQSSIALAGS<u>SAAT</u>-

The C-terminal SAAT amino acids (underlined) were not present in constructs including a candidate peptide as these were deleted following BamHI digestion.

The Lysine-rich region sequence corresponds to human NOS1 residues 354-396 (R354A/G357D/R376K mutant). The "DegroPEx" candidate peptide libraries were separately cloned into the construct in order to be expressed at the C-terminal end of the E3 reporter library polypeptides. Lentivirus was produced and HEK293A cells were infected at an MOI of 0.3 with a library-fold coverage of at least 100. Once antibiotic selection was completed, cells were either treated with DMSO or treated with 10 μM MG132, a proteasomal inhibitor, for 4 hours. Cells were then harvested and sorted by FACS into low and high GFP populations, separately for DMSO- and MG132-treated populations. The genomic DNA was extracted from the populations of interest and analyzed by Next Generation Sequencing (NGS). E3 reporter library polypeptides comprising candidate peptides that can functionally recruit E3 ligases (degrons) are expected to be 1) enriched in the low GFP population in DMSO-treated cells and 2) shift to the high GFP population upon MG132 treatment. 875 hit peptides were identified from screening the libraries (FIG. 5 and FIG. 6).

Example 4

E3 Ligase Screen Proof of Concept Experiment

To further demonstrate the feasibility of the screen described in Example 3, a nucleotide sequence encoding a peptide known to bind to an E3 ligase was cloned into the BamHI site of the E3 reporter library construct described in Example 3 in lieu of the "DegroPEx" candidate library, in order to generate the E3 reporter LDLEMLAPYIP construct. The LDLEMLAPYIP degron peptide (SEQ ID NO: 9) corresponds to the HIF1α Von Hippel-Lindau (VHL) binding sequence. VHL is the substrate binding domain of a Cullin-RING (CLR) E3 ligase. HEK293A cells were infected with the E3 reporter-LDLEMLAPYIP construct using lentivirus, leading to expression of the E3 reporter LDLEMLAPYIP polypeptide, which then bound to VHL CLR E3 ligase and resulted in the polyubiqutination and degradation of the polypeptide, illustrated by markedly lower GFP fluorescence levels compared to reporter-only (GFP alone, 'E3 reporter') cells (FIG. 7). This demonstrates that tagging the reporter with a known E3 binding peptide (degron) successfully results in proteasomal degradation of the reporter, in an E3 dependent manner, and can be directly assessed by monitoring GFP levels.

Example 5

FACS Validation Data Showing that a Candidate Peptide Hit from the Screening Method is Able to Functionally Recruit E3 Ligases to Selectively Degrade a Target.

GFP was used as the target (test protein) in this study. Plasmids encoding GFP alone ('no peptide control' samples), or GFP tagged with either a negative control candidate peptide (a candidate peptide from the 46-mer peptide library that did not lead to degradation of the test protein in a previous screen) or a validated 'hit' candidate peptide ('Hit (#1)', also from the 46-mer peptide library; amino acid sequence MQNNPLTSG-LEPSPPQCDYIRPSLTGKFAG-NPWYYGKVTRHQAEMA as set out in SEQ ID NO: 10) were transduced into HEK293A cells using lentivirus. The tagged GFP constructs were similar to the E3 reporter library polypeptides generated in Example 3 above, comprising the candidate peptides cloned C-terminally to GFP after NGS primer binding sites which also serve as a linker.

GFP-peptide expressing cells were either untreated (DMSO treatment only; 'Peptide+vehicle') or treated with the proteasome inhibitor MG132 (10 μM in DMSO, for 4 h) ('Peptide+MG132'), and were then analyzed by FACS for GFP levels (FIG. 8). Tagging of GFP with a negative control candidate peptide had no effect on GFP levels compared to 'no peptide control' cells, in any condition (FIG. 8A). However, addition of a validated hit candidate peptide (Hit (#1)) to GFP caused marked degradation of GFP ('Peptide+vehicle') compared to 'no peptide control' cells in untreated samples; addition of MG132 to cells expressing GFP-Hit (#1) restored GFP levels back to that of the 'no peptide control' cells (FIG. 8B). These results demonstrate that Hit (#1) is an E3-binding peptide and directs target degradation via the Ubiquitin Proteasome System.

Example 6

Western Blot Validation Data Showing Two Candidate Peptide Hits from the Screening Method are Able to Functionally Recruit E3 Ligases to Selectively Degrade a Target Plasmids encoding for GFP alone (control), or GFP tagged with one of the validated candidate peptide hits from the screening method, Hit (#1) (see Example 5) or Hit (#2), were transduced into HEK293A cells using lentivirus. Cells expressing tagged GFP were either untreated (DMSO treatment only) or treated with the proteasome inhibitor MG132 for 4 hours, after which they were harvested and analyzed by Western Blotting. Membranes were probed with primary antibodies against GFP (CST #2555), or actin (Abcam ab179467) as a loading control. After the addition of HRP-conjugated secondary antibodies, protein signals were detected by chemiluminescence (FIG. 9). Expression of GFP-Hit (#1) or GFP-Hit (#2) led to almost complete depletion of GFP in the absence of MG132 compared to GFP (control) expressing cells. GFP levels were restored in both tagged GFP cell lines upon inhibition of the proteasome (MG132 treated samples) demonstrating that Hit (#1) and Hit (#2) lead to selective GFP degradation via functional recruitment of E3 ligases and the Ubiquitin Proteasome System, meaning Hit (#1) and Hit (#2) are E3-binding peptides (degrons).

Example 7

Sequence Analysis of Degron Peptide Hits Identified by the Screening Method

High confidence hits from a screen (candidate peptides that led to selective degradation of the test protein under conditions enabling ubiquitination of proteins by an E3, i.e. degron peptides) were clustered by amino acid sequence similarity using Clustal Omega (https://www.ebi.ac.uk/Tools/msa/clustalo/). The graph (FIG. 10) shows clusters of identical amino acid sequences being enriched in the hit pool, indicative of families of common motifs among the hits able to facilitate functional recruitment of E3 ligases to a substrate. These common motifs may correlate with particular interacting E3s. Further, the common motifs can be enriched and combined in further rounds of candidate peptide generation and screening in order to increase the efficiency and/or specificity of degradation via E3s.

Example 8

Demonstration that Fluorescence Decrease in Hits was not the Result of a Block in Translation Host cells (HEK293T) were infected with a lentivirus mixture comprising the full DegroPEx library of 46AA peptides fused to GFP or an "empty" reporter-only construct. Cells were then treated with either vehicle (DMSO), cycloheximide (CHX), MG132, or both MG132 and CHX. After four hours, the cells were analysed by flow cytometry to evaluate the fluorescence rate of each treatment group.

Vehicle-treated reporter-only cells were found to be highly fluorescent (FIG. 11A-C, dark trace), whilst library-infected vehicle-treated cell equivalents showed a distinct low-fluorescence population (FIG. 11D-F, dark trace).

Treatment of the library-infected group with the proteasome inhibitor MG132 reverted it to a more fluorescent signature (FIG. 11E, light trace), whilst treatment with translation blocker cycloheximide (CHX) caused a decrease in the overall fluorescence signature (FIG. 11A, 110, light trace), shifting the hit population to a very low fluorescence measure (FIG. 11D, light trace). Treatment of the library-infected group with both MG132 and CHX (FIG. 11F) resulted in a trace similar to that for MG132 treatment alone.

These results indicate that the cause of fluorescence decrease in the peptide hits is not a block in translation, since CHX treatment alone results in further diminishment of fluorescence. This demonstrates that the low reporter signal in hits is caused by degradation of the protein via the UPSsystem.

Example 9

Validation of Screening Hits

Nominated hit peptide sequences from both an 11AA and 46AA screen generated according to Example 3 were resynthesized and recloned as individual homogeneous plasmids and used to generate new reporter-peptide hybrids in individual lentivirus reagents. These were used to infect new populations of cells which, following selection, were evaluated for the fluorescence signature as described above. This was reported as the modal fluorescence intensity and normalized to the reporter-only construct (FIG. 12, 'GFP_C-TRL', intensity of 1.0)). Individual hits were successfully validated from both primary screens where they gave a normalized modal intensity of less than 1.0. For both screens, A von Hippel-Lindau (VHL) ligand fused to the reporter was used as a positive control, in each case giving a normalized modal intensity of less than 1.0 as expected (FIG. 12).

Performing one-by-one validation of hits in this way allowed refined quantitative ranking of validated hits, as the normalized modal intensity of each could be compared.

Following further treatment with proteasome inhibitor MG132 (data not shown), all hits showed a reversal of the effect on fluorescence, indicating that the reduction in fluorescence was due to degradation of the reporter protein via the ubiquitin proteasome system recruited by the hit peptide.

Example 10

Demonstration of Diverse Substrate Activity of DegroPEx Hits

Five hit peptide sequences identified from screens as described above were each fused to the Tau protein isoform Tau441 sequence (instead of the GFP reporter sequence), and were then introduced into cells by transient transfection. Tau441 is a disease-associated long protein isoform, which in neurons of affected patients can aggregate and cause or potentiate neurodegenerative illnesses. It is approximately twice the length of GFP, with very different physicochemical properties, including but not limited to the absence of fluorescence and propensity to aggregate as described above.

Following incubation for 4 hours, total protein was extracted from the cells and separated by gel electrophoresis. Degradation of Tau was analysed by performing western blotting (FIG. 13) using an anti-Tau antibody (ab32057; AbCam), compared with the expression level of the housekeeping gene GAPDH (21185; Cell Signalling Technologies). Tau441 alone (without a fused peptide) was used as a degradation-negative control ('CTRL' on FIG. 13), and Tau441 fused to a VHL ligand was used as a degradation-positive control ('CTRL-VHL' on FIG. 13).

Total Tau protein was significantly diminished compared to GAPDH when Tau was fused to one of three screen hit peptides (A2, E4. H8). This demonstrates that these three peptides can direct the proteasomal degradation of the diverse proteins GFP and Tau.

When bound to Tau the other two GFP-screen derived peptides tested (E10, I7) showed similar levels of Tau protein to that of GAPDH, indicating that those peptides induced reduced degradation of Tau in comparison with peptides A2, E4 and H8. That was also the case for Tau bound to a VHL ligand ('CTRL-VHL'). This indicates that some of the novel peptide sequences, and VHL, elicit a substrate-specific response.

Example 11

Ubiquitination of GFP Increases with Fusion of Hit Peptides

Selected hit peptides A2 and E4 were individually recloned as GFP fusions and used to generate homogenous cell populations. The cell populations, plus cell populations expressing either untagged GFP reporter or GFP fused to a VHL ligand, were incubated with and without the presence of the proteasomal inhibitor MG132. Following a 4-hour incubation, whole cell lysates were prepared. Immunoprecipitations (IP) were conducted using an anti-GFP antibody (2555; Cell Signalling Technologies) to purify the reporter protein and reporter-peptide fusion proteins from the whole-cell lysates. Western blotting (WB) was then used to probe for ubiquitin bound to the reporter or to the peptide-reporter fusion proteins, using either an anti-ubiquitin antibody (3936; clone P4D1; Cell Signalling Technologies), or an anti-K48 linkage-specific ubiquitin antibody (8081; done D9D5; Cell Signalling Technologies), or to probe for GFP using an anti-GFP antibody (2555; Cell Signalling Technologies).

See FIG. 14 for results. As expected, reporter expressed without a peptide tag showed no ubiquitination and the greatest levels of GFP in the Western blot. The presence of MG132 during cell incubation enhanced the ubiquitination levels observed with the hit peptide-GFP fusion proteins, using either the anti-ubiquitin or anti-K48 linkage specific antibody to probe the Western blots. The hit peptide-GFP fusions showed K48 (degron-specific) ubiquitination, to varying extents.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about A to about B," or, equivalently, "from approximately A to B," or, equivalently, "from approximately A-B") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. Various further aspects and embodiments of the present invention will be apparent to those skilled in the art in view of the present disclosure. All documents mentioned in this specification are incorporated herein by reference in their entirety. "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein. Unless context dictates otherwise, the descriptions and definitions of the features set out above are not limited to any particular aspect or embodiment of the invention and apply equally to all aspects and embodiments which are described. It will further be appreciated by those skilled in the art that although the invention has been described by way of example with reference to several embodiments. It is not limited to the disclosed embodiments and that alternative embodiments could be constructed without departing from the scope of the invention as defined in the appended claims. Unless specifically stated, a process or method comprising steps may be performed in any suitable order. Thus steps can be performed in any appropriate order, including contemporaneously.

The invention claimed is:

1. A method for screening a library of peptides to identify a peptide capable of binding to a ubiquitin protein ligase (E3), the method comprising:

providing in a eukaryotic cell a hybrid polypeptide comprising a candidate peptide functionally linked to a test protein, under conditions enabling ubiquitination of proteins by an E3, wherein the candidate peptide is between about 7 and 110 amino acids in length; and detecting the amount of test protein present in the cell;

wherein a reduced amount of the test protein determines the candidate peptide as a peptide that binds or is capable of binding to an E3 and thereby leading to degradation of the test protein;

wherein the hybrid polypeptide includes a domain being the test protein or a test protein-binding (poly)peptide, and a domain being a peptide linker;

wherein an amino acid sequence of the test protein is genetically engineered to comprise a plurality of lysine residues, wherein the test protein is genetically engineered to comprise an N-terminal lysine-rich region derived from human nitric oxide synthase (NOS1); and wherein the library of peptides comprises a plurality of at least 5,000 different candidate peptides each functionally linked to the test protein and each having a length of between about 7 and 110 amino acids, each candidate peptide of the library of peptides having an amino acid sequence being a region of a sequence selected from the amino acid sequence of a naturally occurring protein of one or more organisms; and wherein an amino acid sequence of each of at least 50 candidate peptides of the library of peptides is a sequence region of the amino acid sequence of a different protein of a plurality of different naturally occurring proteins.

2. The method of claim 1, wherein the hybrid polypeptide comprises a domain being the candidate peptide, a domain being the test protein, and a domain being the peptide linker.

3. The method of claim 1, wherein a reduction in the amount of test protein present in the cell is analysed in the presence of a proteasome inhibitor.

4. The method of claim 3, wherein the proteasome inhibitor is MG132.

5. The method of claim 1, wherein the test protein is a reporter protein, a reporter protein fusion, or is functionally linked to a reporter protein, and wherein detecting the amount of test protein present in the cell comprises detecting the amount of reporter protein present in the cell.

6. The method of claim 5, further comprising selecting a cell based on a reduction in the amount of reporter protein present in the cell.

7. The method of claim 6, wherein selecting the cell is by separation using fluorescence-activated cell sorting (FACS).

8. The method of claim 1, wherein the test protein comprises a protein associated with a disease, disorder, or condition when expressed or over-expressed in a eukaryotic cell.

9. The method of claim 8, wherein the test protein is selected from proteins of an oncogenic pathway; viral host factors; viral proteins; mis-folded proteins; aggregating proteins; toxic proteins; proteins involved in immune recognition, immune response or auto-immunity; or shuttle proteins.

10. The method of claim 1, wherein a reduced amount of the test protein is determined by comparison to a control, and wherein the test protein comprises a first reporter protein.

11. The method of claim 10, wherein the control comprises i) a control eukaryotic cell comprising the test protein comprising the first reporter protein and the first reporter protein is not functionally linked to the candidate peptide, or ii) a second reporter protein present in the eukaryotic cell and not functionally linked to the candidate peptide.

12. The method of claim 11, wherein the first reporter protein and the second reporter protein are fluorescent proteins having different excitation and/or emission frequencies.

13. The method of claim 10, wherein the control comprises a control eukaryotic cell comprising the candidate peptide functionally linked to the test protein under conditions that prevent ubiquitination of proteins by an E3.

14. The method of claim 1, wherein the library of peptides is provided by a library of nucleic acids capable of expression in the eukaryotic cell.

15. The method of claim 14, wherein each nucleic acid of the library of nucleic acids encodes for a hybrid polypeptide that includes a domain being a candidate peptide, a domain being the test protein or a test protein binding polypeptide, and a domain being a linker.

16. The method of claim 1, wherein the hybrid polypeptide comprises a domain being the candidate peptide, a domain being a test protein-binding (poly)peptide, and a domain being a peptide linker, and wherein, when the hybrid polypeptide and the test protein are present in the cell, the hybrid polypeptide binds to the test protein via the test protein-binding (poly)peptide.

* * * * *

SEQUENCE LISTING

```
<160> NUMBER OF SEQ ID NOS: 10

<210> SEQ ID NO 1
<211> LENGTH: 16
<212> TYPE: PRT
<213> ORGANISM: Artificial Sequence
<220> FEATURE:
<223> OTHER INFORMATION: Target protein binding moiety peptide

<400> SEQUENCE: 1

Leu Pro His Leu Gln Arg Ser Pro Pro Asp Gly Gln Ser Phe Arg Ser
1               5                   10                  15

<210> SEQ ID NO 2
<211> LENGTH: 7
<212> TYPE: PRT
<213> ORGANISM: Artificial Sequence
<220> FEATURE:
<223> OTHER INFORMATION: E3 ligase binding moeity peptide

<400> SEQUENCE: 2

Ala Leu Ala Pro Tyr Ile Pro
1               5

<210> SEQ ID NO 3
<211> LENGTH: 6
<212> TYPE: PRT
<213> ORGANISM: Artificial Sequence
<220> FEATURE:
<223> OTHER INFORMATION: GGGGSS Linker

<400> SEQUENCE: 3

Gly Gly Gly Gly Ser Ser
1               5

<210> SEQ ID NO 4
<211> LENGTH: 34
<212> TYPE: PRT
<213> ORGANISM: Artificial Sequence
<220> FEATURE:
<223> OTHER INFORMATION: 3BP2(410-425)- ALAPYIP peptide

<400> SEQUENCE: 4

Met Gly Leu Pro His Leu Gln Arg Ser Pro Pro Asp Gly Gln Ser Phe
1               5                   10                  15

Arg Ser Leu Glu Gly Gly Gly Gly Ser Ser Ala Ala Leu Ala Pro Tyr
            20                  25                  30

Ile Pro

<210> SEQ ID NO 5
<211> LENGTH: 26
<212> TYPE: PRT
<213> ORGANISM: Artificial Sequence
<220> FEATURE:
<223> OTHER INFORMATION: 3BP2(410-425) linker peptide
```

-continued

```
<400> SEQUENCE: 5

Met Gly Leu Pro His Leu Gln Arg Ser Pro Pro Asp Gly Gln Ser Phe
1               5                   10                  15

Arg Ser Leu Glu Gly Gly Gly Gly Ser Ser
            20                  25

<210> SEQ ID NO 6
<211> LENGTH: 34
<212> TYPE: PRT
<213> ORGANISM: Artificial Sequence
<220> FEATURE:
<223> OTHER INFORMATION: 3BP2(410-425)- ALAAAIP peptide

<400> SEQUENCE: 6

Met Gly Leu Pro His Leu Gln Arg Ser Pro Pro Asp Gly Gln Ser Phe
1               5                   10                  15

Arg Ser Leu Glu Gly Gly Gly Gly Ser Ser Ala Ala Leu Ala Ala Ala
            20                  25                  30

Ile Pro

<210> SEQ ID NO 7
<211> LENGTH: 35
<212> TYPE: PRT
<213> ORGANISM: Artificial Sequence
<220> FEATURE:
<223> OTHER INFORMATION: 3BP2(410-425) - LDPETGEYL peptide

<400> SEQUENCE: 7

Met Gly Leu Pro His Leu Gln Arg Ser Pro Pro Asp Gly Gln Ser Phe
1               5                   10                  15

Arg Ser Leu Glu Gly Gly Gly Gly Ser Ser Leu Asp Pro Glu Thr Gly
            20                  25                  30

Glu Tyr Leu
        35

<210> SEQ ID NO 8
<211> LENGTH: 317
<212> TYPE: PRT
<213> ORGANISM: Artificial Sequence
<220> FEATURE:
<223> OTHER INFORMATION: E3 reporter peptide

<400> SEQUENCE: 8

Met Ala Thr Lys Asp Gln Leu Phe Pro Leu Ala Lys Glu Phe Ile Asp
1               5                   10                  15

Gln Tyr Tyr Ser Ser Ile Lys Lys Phe Gly Ser Lys Ala His Met Glu
            20                  25                  30

Arg Leu Glu Glu Val Asn Lys Glu Ile Asp Thr Thr Ser Gly Gly Gly
        35                  40                  45

Ser Arg Val Ser Lys Gly Glu Glu Leu Phe Thr Gly Val Val Pro Ile
    50                  55                  60

Leu Val Glu Leu Asp Gly Asp Val Asn Gly His Lys Phe Ser Val Ser
65                  70                  75                  80

Gly Glu Gly Glu Gly Asp Ala Thr Tyr Gly Lys Leu Thr Leu Lys Phe
                85                  90                  95

Ile Cys Thr Thr Gly Lys Leu Pro Val Pro Trp Pro Thr Leu Val Thr
            100                 105                 110

Thr Phe Thr Tyr Gly Val Gln Cys Phe Ala Arg Tyr Pro Asp His Met
        115                 120                 125
```

-continued

```
Lys Gln His Asp Phe Phe Lys Ser Ala Met Pro Glu Gly Tyr Val Gln
    130                 135                 140
Glu Arg Thr Ile Phe Phe Lys Asp Asp Gly Asn Tyr Lys Thr Arg Ala
145                 150                 155                 160
Glu Val Lys Phe Glu Gly Asp Thr Leu Val Asn Arg Ile Glu Leu Lys
                165                 170                 175
Gly Ile Asp Phe Lys Glu Asp Gly Asn Ile Leu Gly His Lys Leu Glu
                180                 185                 190
Tyr Asn Tyr Asn Ser His Lys Val Tyr Ile Thr Ala Asp Lys Gln Lys
            195                 200                 205
Asn Gly Ile Lys Val Asn Phe Lys Thr Arg His Asn Ile Glu Asp Gly
210                 215                 220
Ser Val Gln Leu Ala Asp His Tyr Gln Gln Asn Thr Pro Ile Gly Asp
225                 230                 235                 240
Gly Pro Val Leu Leu Pro Asp Asn His Tyr Leu Ser Thr Gln Ser Ala
                245                 250                 255
Leu Ser Lys Asp Pro Asn Glu Lys Arg Asp His Met Val Leu Leu Glu
                260                 265                 270
Phe Val Thr Ala Ala Gly Ile Thr Leu Gly Met Asp Glu Leu Tyr Lys
                275                 280                 285
Glu Phe Gly Gly Gly Ser Ala Ile His Ala Val Leu Thr Ser Ile Asn
    290                 295                 300
Gln Ser Ser Ile Ala Leu Ala Gly Ser Ser Ala Ala Thr
305                 310                 315

<210> SEQ ID NO 9
<211> LENGTH: 11
<212> TYPE: PRT
<213> ORGANISM: Artificial Sequence
<220> FEATURE:
<223> OTHER INFORMATION: HIF1 alpha VHL binding sequence

<400> SEQUENCE: 9

Leu Asp Leu Glu Met Leu Ala Pro Tyr Ile Pro
1               5                   10

<210> SEQ ID NO 10
<211> LENGTH: 46
<212> TYPE: PRT
<213> ORGANISM: Artificial Sequence
<220> FEATURE:
<223> OTHER INFORMATION: Candidate peptide

<400> SEQUENCE: 10

Met Gln Asn Asn Pro Leu Thr Ser Gly Leu Glu Pro Ser Pro Pro Gln
1               5                   10                  15
Cys Asp Tyr Ile Arg Pro Ser Leu Thr Gly Lys Phe Ala Gly Asn Pro
                20                  25                  30
Trp Tyr Tyr Gly Lys Val Thr Arg His Gln Ala Glu Met Ala
            35                  40                  45
```